United States Patent
Makino et al.

(10) Patent No.: US 10,190,896 B2
(45) Date of Patent: Jan. 29, 2019

(54) ULTRASONIC FLOW SENSOR AND METHOD OF ATTACHING THE SAME

(71) Applicant: Keyence Corporation, Osaka-shi, Osaka (JP)

(72) Inventors: Kazuhiro Makino, Osaka (JP); Hiroshi Kashima, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

(21) Appl. No.: 15/819,480

(22) Filed: Nov. 21, 2017

(65) Prior Publication Data
US 2018/0209829 A1 Jul. 26, 2018

(30) Foreign Application Priority Data

Jan. 26, 2017 (JP) ................................ 2017-012040

(51) Int. Cl.
*G01F 1/66* (2006.01)
*G01K 1/00* (2006.01)

(52) U.S. Cl.
CPC ............... *G01F 1/662* (2013.01); *G01K 1/00* (2013.01)

(58) Field of Classification Search
CPC ....................................................... G01F 1/66
See application file for complete search history.

(56) References Cited

U.S. PATENT DOCUMENTS

| 7,373,839 | B2 | 5/2008 | Wiest et al. | |
| 7,703,337 | B1* | 4/2010 | Feller | G01F 1/662 |
| | | | | 73/861.27 |
| 7,963,175 | B2* | 6/2011 | Gysling | G01F 1/667 |
| | | | | 73/861.27 |
| 8,267,365 | B2 | 9/2012 | Wiest et al. | |
| 8,960,017 | B2* | 2/2015 | Schwarz | G01F 1/663 |
| | | | | 73/861.25 |
| 9,448,092 | B1* | 9/2016 | Hawwa | G01F 1/663 |
| 9,689,727 | B2* | 6/2017 | Kissling | G01F 1/662 |

FOREIGN PATENT DOCUMENTS

| JP | 61-6725 | 1/1986 |
| JP | 5-72011 | 3/1993 |
| JP | 10-213467 | 8/1998 |
| JP | 10-221137 | 8/1998 |
| JP | 2000-46607 | 2/2000 |
| WO | WO 99/0172 A1 | 1/1999 |

OTHER PUBLICATIONS

U.S. Appl. No. 15/819,506, filed Nov. 21, 2017, Daishiro Ishikawa et al., Keyence Corporation.

* cited by examiner

*Primary Examiner* — Jewel V Dowtin

(57) ABSTRACT

To position first and second sensor units easily at adequate positions simply by an operation for fixing a fitting to given piping. A first fitting for a first sensor unit and a second fitting for a second sensor unit are provided. The first and second fittings include a pair of arm portions configured to regulate relative position between the first sensor unit and the second sensor unit in a circumferential direction of the piping, and a guide portion formed at least on the arm portions, and configured to guide relative positioning between the first fitting and the second fitting in an axial direction of the piping according to a diameter of the piping.

15 Claims, 31 Drawing Sheets

ULTRASONIC FLOW SENSOR AND METHOD OF ATTACHING THE SAME

CROSS-REFERENCE TO RELATED APPLICATIONS

The present application claims foreign priority based on Japanese Patent Application No. 2017-012040, filed Jan. 26, 2017, the contents of which is incorporated herein by reference.

BACKGROUND OF THE INVENTION

1. Field of the Invention

The present invention relates to, so-called clamp-on ultrasonic flow sensors and, more specifically, to the ultrasonic flow sensors configured to be attachable to and detachable from peripheral surfaces of piping, and a method of attaching the same.

2. Description of Related Art

Ultrasonic flow sensors are used for measuring a flow rate of a fluid flowing in piping. JP-A-2000-46607 discloses a clamp-on ultrasonic flow sensor which enables retrofitting on an outer peripheral surface of the piping, and a fitting thereof. The fitting enables the clamp-on ultrasonic flow sensor to be installed on the piping having various diameters.

JP-A-2000-46607 discloses embodiments in which first and second sensor units are arranged in a V-shape and in a Z-shape. In the V-shaped arrangement, the first and second sensor units are installed on a first mother line of piping at first and second positions apart from each other along a direction of longitudinal axis of the piping. In the Z-shaped arrangement, the first sensor unit is installed at first position on first mother line of the piping, and the second sensor unit is installed on a second mother line that opposes the first mother line in a diameter direction at the second position apart from the aforesaid first position along the direction of the longitudinal axis of the piping.

The fitting disclosed in JP-A-2000-46607 is fixed to the piping with a band. The two sensor portions are accommodated in the fitting for the V-shaped arrangement. In other words, the fitting for the V-shaped arrangement disclosed in JP-A-2000-46607 is configured to position the first and second sensor units at positions apart from each other along the direction of the longitudinal axis of the piping with a single fitting. The fitting in which the two sensor portions are accommodated is fixed to the piping with the band, so that the first and second sensor units are arranged in the V-shape.

A fitting for Z-shaped arrangement accommodates one sensor portion in each fitting. Two of such fittings are provided and each fitting is fixed to the piping with a band. The first fitting is then positioned at the first position on the first mother line of the piping, and the second fitting is positioned at on the second mother line opposing the first mother line in the diameter direction at a second position apart from the first position along the direction of the longitudinal axis of the piping, so that the first and second sensor units are arranged in the Z-shape.

SUMMARY OF THE INVENTION

Both in the V-shaped and the Z-shaped arrangements, adequate setting of a relative position between the first and second sensor units is required in order to maintain signal transmission between the first and second sensor units. Referring again to JP-A-2000-46607, the fitting for the V-shaped arrangement includes marks which indicate a distance in the direction of the longitudinal axis.

An operator investigates a distance between the first and second sensor units, in other words, the distance between the first and second sensor units on the first mother line of the piping with parameters such as a diameter of piping to be applied, a wall thickness of the pipe, a fluid to be flowed in the piping. With the obtained value of the adequate distance, positions of the first and second sensor units are determined within the fitting for the V-shaped arrangement by the help of the marks described above. For the Z-shaped arrangement, steps of positioning the first fitting on the first mother line, searching the second mother line opposing the first mother line in the diameter direction, and positioning the second fitting on the second mother line are required are required. Adequate adjustment of the distance between the first fitting and the second fitting along the direction of the longitudinal axis of the piping is also required as a matter of course. Such positioning works take lots of time and labors and user friendliness relating to attachment on the piping is low.

It is an object of the invention to provide a clamp-on ultrasonic flow sensor which allows easy positioning of the first and second sensor units at adequate positions simply by fixing a fitting on given piping.

The technical object described above is achieved by a first aspect of the invention. The first aspect of the invention provides an ultrasonic flow sensor including:

a first sensor unit including a first ultrasonic device which performs at least one of transmission of ultrasonic waves to a fluid flowing in piping and reception of ultrasonic waves from the fluid flowing in the piping;

a second sensor unit including a second ultrasonic device which performs at least the other one of transmission of ultrasonic waves to a fluid flowing in the piping and reception of ultrasonic waves from the fluid flowing in the piping;

a calculation part configured to calculate a flow rate of the fluid in the piping by obtaining a time difference between times required for ultrasonic waves to propagate from an upstream side to a downstream side and from the downstream side to the upstream side of the fluid flowing in the piping based on output signals from the first ultrasonic device and the second ultrasonic device; and optionally, for example, an output part configured to output ON/OFF signals relating to the flow rate of the fluid flowing the piping based on the flow rate calculated by the calculation part and a predetermined flow rate threshold value;

a first fitting configured to accommodate the first sensor unit and fix the first sensor unit to the piping, the first fitting including a first position regulating portion configured to come into contact with an outer peripheral surface of the piping so as to align orientation of the first ultrasonic device with respect to the second ultrasonic device in an axial direction of the piping when viewing in a radial direction of the piping and a first housing portion configured to accommodate the first sensor unit from the opposite side of the piping with respect to the first position regulating portion; and a second fitting configured to accommodate the second sensor unit and fix the second sensor unit to the piping, the second fitting including a second position regulating portion configured to come into contact with the outer peripheral surface of the piping so as to align orientation of the second ultrasonic device with respect to the first ultrasonic device in the axial direction of the piping when viewing in the radial direction of the piping, and a second housing portion configured to accommodate the second sensor unit from the opposite side of the piping with respect to the second position regulating portion, wherein the first and second fittings further include a pair of first and second arm portions extending from one of the first housing portion and the second housing portion as a base end to the other to regulate the relative position between the first housing portion and the second housing portion in a circumferential direction of the piping on both sides of a plane including the axial line of the piping, the first ultrasonic device, and the second ultrasonic device; and a guide portion formed at least on the arm portions and configured to guide relative positioning between the first fitting and the second fitting in the axial direction of the piping according to a diameter of the piping.

The technical object described above is achieved by a second aspect of the invention. The second aspect of the invention is achieved by a method of attaching an ultrasonic flow sensor including:

preparing the ultrasonic flow sensor including a first sensor unit including a first ultrasonic device which performs at least one of transmission of ultrasonic waves to a fluid flowing in piping and reception of ultrasonic waves from the fluid flowing in the piping;

a second sensor unit including a second ultrasonic device which performs at least the other one of transmission of ultrasonic waves to a fluid flowing in the piping and reception of ultrasonic waves from the fluid flowing in the piping;

a calculation part configured to calculate a flow rate of the fluid in the piping by obtaining a time difference between times required for ultrasonic waves to propagate from an upstream side to a downstream side and from the downstream side to the upstream side of the fluid flowing in the piping based on output signals from the first ultrasonic device and the second ultrasonic device, and optionally, for example, an output part configured to output ON/OFF signals relating to the flow rate of the fluid flowing the piping based on the flow rate calculated by the calculation part and a predetermined flow rate threshold value;

a first fitting configured to accommodate the first sensor unit and fix the first sensor unit to the piping, the first fitting including a first position regulating portion configured to come into contact with an outer peripheral surface of the piping so as to align orientation of the first ultrasonic device with respect to the second ultrasonic device in an axial direction of the piping when viewing in a radial direction of the piping and a first housing portion configured to accommodate the first sensor unit from the opposite side of the piping with respect to the first position regulating portion;

a second fitting configured to accommodate the second sensor unit and fix the second sensor unit to the piping, the second fitting including a second position regulating portion configured to come into contact with the outer peripheral surface of the piping so as to align orientation of the second ultrasonic device with respect to the first ultrasonic device in the axial direction of the piping when viewing in the radial direction of the piping, and a second housing portion configured to accommodate the second sensor unit from the opposite side of the piping with respect to the second position regulating portion; and a fixing member configured to press and fix the first fitting and the second fitting with respect to the piping, wherein the first and second fittings further include: a pair of arm portions extending from one of the first housing portion and the second housing portion as a base end to the other to regulate the relative position between the first housing portion and the second housing portion in a circumferential direction of the piping on both sides of a plane including the axial line of the piping, the first ultrasonic device, and the second ultrasonic device; and a guide portion formed at least on the arm portions and configured to guide relative positioning between the first fitting and the second fitting in the axial direction of the piping according to a diameter of the piping, a first step of provisionally fixing the second sensor unit to the piping by using the second fitting;

a second step of rotating the second fitting in the circumferential direction of the piping after the first step;

a third step of provisionally fixing the first sensor unit to the piping by using the first fitting and adjusting relative position between the first fitting and the second fitting based on an action of an information conversion mechanism before the provisional fixation after the second step; and fixing the first fitting and the second fitting to the piping after the third step.

According to the method of attaching of the invention, the first and second sensor units may be positioned at adequate positions only by an operation to fix the fitting to given piping, and a user is allowed to attach the first and second sensor units to the piping in the Z-shaped arrangement in a state of facing the piping.

Other objects and advantageous effects of the invention will be apparent from detailed description of preferred embodiments of the invention given below.

DESCRIPTION OF EMBODIMENTS

Figure 38:
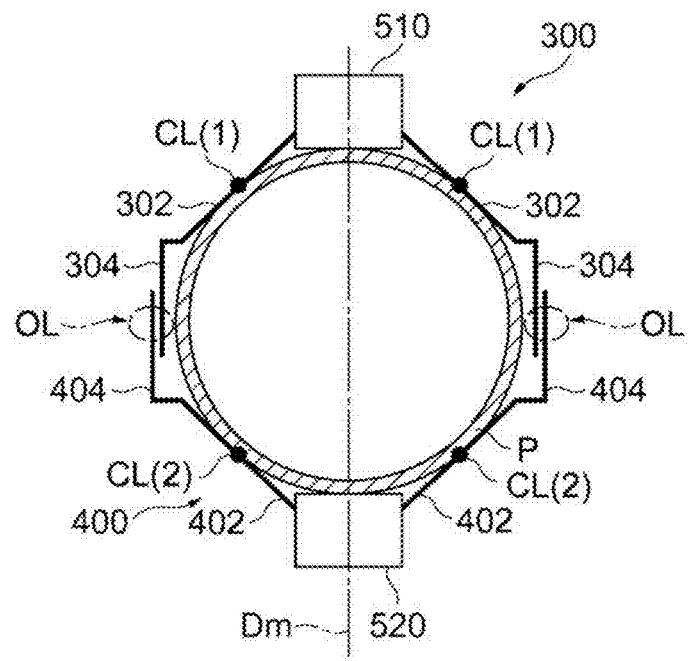
FIG. 38 is a conceptual drawing illustrating a specific example included in the invention.
Figure 39:
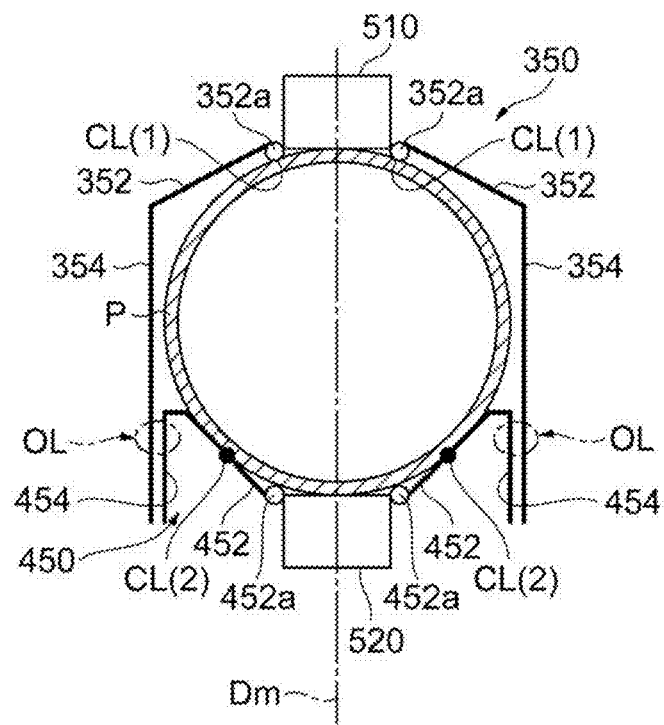
FIG. 39 is a conceptual drawing illustrating another specific example included in the invention.
Figure 40:
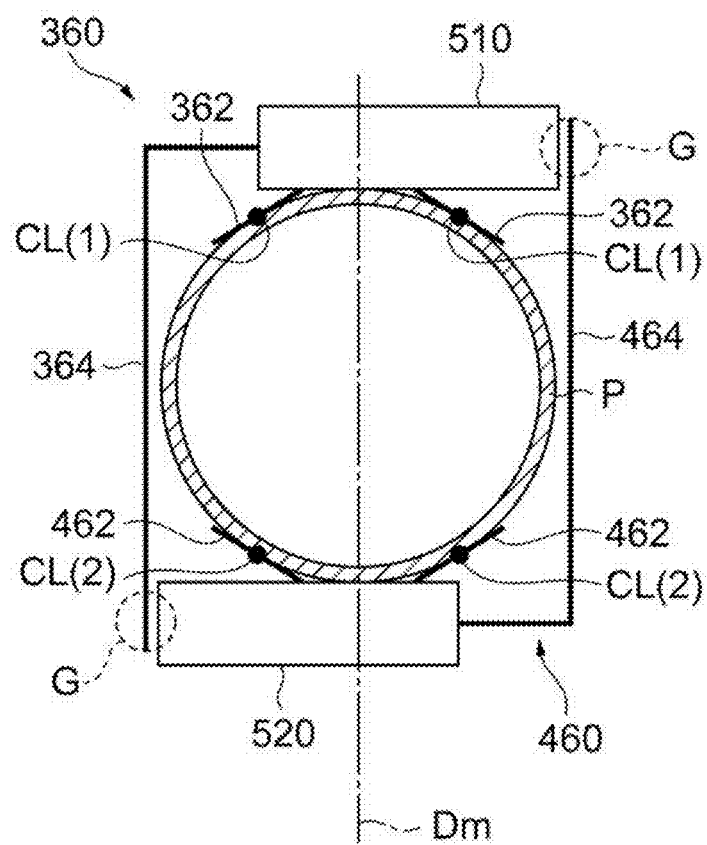
FIG. 40 is a conceptual drawing illustrating still another specific example included in the invention.

Referring to attached drawings, the present invention will be described below. Referring now to FIG. 38 to FIG. 40, specific examples included in the invention will be described.

FIG. 38 illustrates a specific example included in the invention. Reference numeral 300 indicates a first fitting (fixture), and reference numeral 400 indicates a second fitting (fixture). The first and second fittings (fixtures) 300 and 400 are used for attaching a first unit housing case 510 for accommodating a first sensor unit provided with a first ultrasonic device and a second unit housing case 520 for accommodating a second sensor unit provided with a second ultrasonic device on a peripheral surface of piping P. The first sensor unit is accommodated in the first unit housing case 510 in a state of being positioned. In the same manner, the second sensor unit is accommodated in the second unit housing case 520 in the state of being positioned.

The first fitting 300 includes the first unit housing case 510, a first position regulating portion 302 and a pair of first arm portions 304 extending respectively from both side edges of the first position regulating portion 302. In the specific example illustrated in FIG. 38, the first unit housing case 510 and the first position regulating portion 302 constitute a "first housing portion". The pair of first arm portions 304 have a molded shape.

The first position regulating portion 302 is in contact with the piping P at a plurality of points CL(1) on both sides of the first unit housing case 510, whereby the orientation of the first unit housing case 510 is aligned with a diameter direction Dm of the piping P. The first position regulating portion 302 extending (having a length) along the axial direction of the piping contributes to align the orientation of the first ultrasonic device provided in the first sensor unit in the first unit housing case 510 with respect to the second ultrasonic device provided in the second sensor unit in the second unit housing case 520 along the axial direction of the piping when viewing the first unit housing case 510 from a radial direction of the piping. In other words, orientations of lines passing through the first ultrasonic device and the second ultrasonic device when viewed in the radial direction of the piping are aligned with the axial direction of the piping.

The second fitting 400 includes the second unit housing case 520, a second position regulating portion 402 and a pair of second arm portions 404 extending respectively from both side edges of the second position regulating portion 402. In the specific example illustrated in FIG. 38, the second unit housing case 520 and the second position regulating portion 402 constitute a "second housing portion". The pair of second arm portions 404 have a molded shape.

The second position regulating portion 402 is in contact with the piping P at a plurality of positions CL(2) on both sides of the second unit housing case 520, whereby the orientation of the second unit housing case 520 is aligned with the diameter direction Dm of the piping P. The second position regulating portion 402, in the same manner as the first position regulating portion 302, extending (having a length) along the axial direction of the piping contributes to align the orientation of the second ultrasonic device provided in the second sensor unit in the second unit housing case 520 with respect to the first ultrasonic device provided in the first sensor unit in the first unit housing case 510 along the axial direction of the piping when viewing the second unit housing case 520 from the radial direction of the piping. In other words, orientations of the lines passing through the second ultrasonic device and the first ultrasonic device when viewed from the radial direction of the piping are aligned with the axial direction of the piping.

In the specific example illustrated in FIG. 38, the first and second arm portions 304 and 404 extend respectively from both end portions of the first position regulating portion 302 and the second position regulating portion 402, and include overlapped portions OL adjacent to and overlapping with each other. The overlapped portions OL are each provided with a guide portion which guides relative positioning between the first fitting 300 and the second fitting 400 in the axial direction of the piping depending on the diameter of the piping.

Examples of the guide portions include a configuration in which projecting pins provided on the first arm portions 304 are slidable respectively along slit-like guide grooves (inclined with respect to the axial direction of the piping) provided on the second arm portions 404 to guide relative positioning between the first fitting 300 and the second fitting 400 (detailed description will be given later with reference to FIG. 1).

Figure 32:
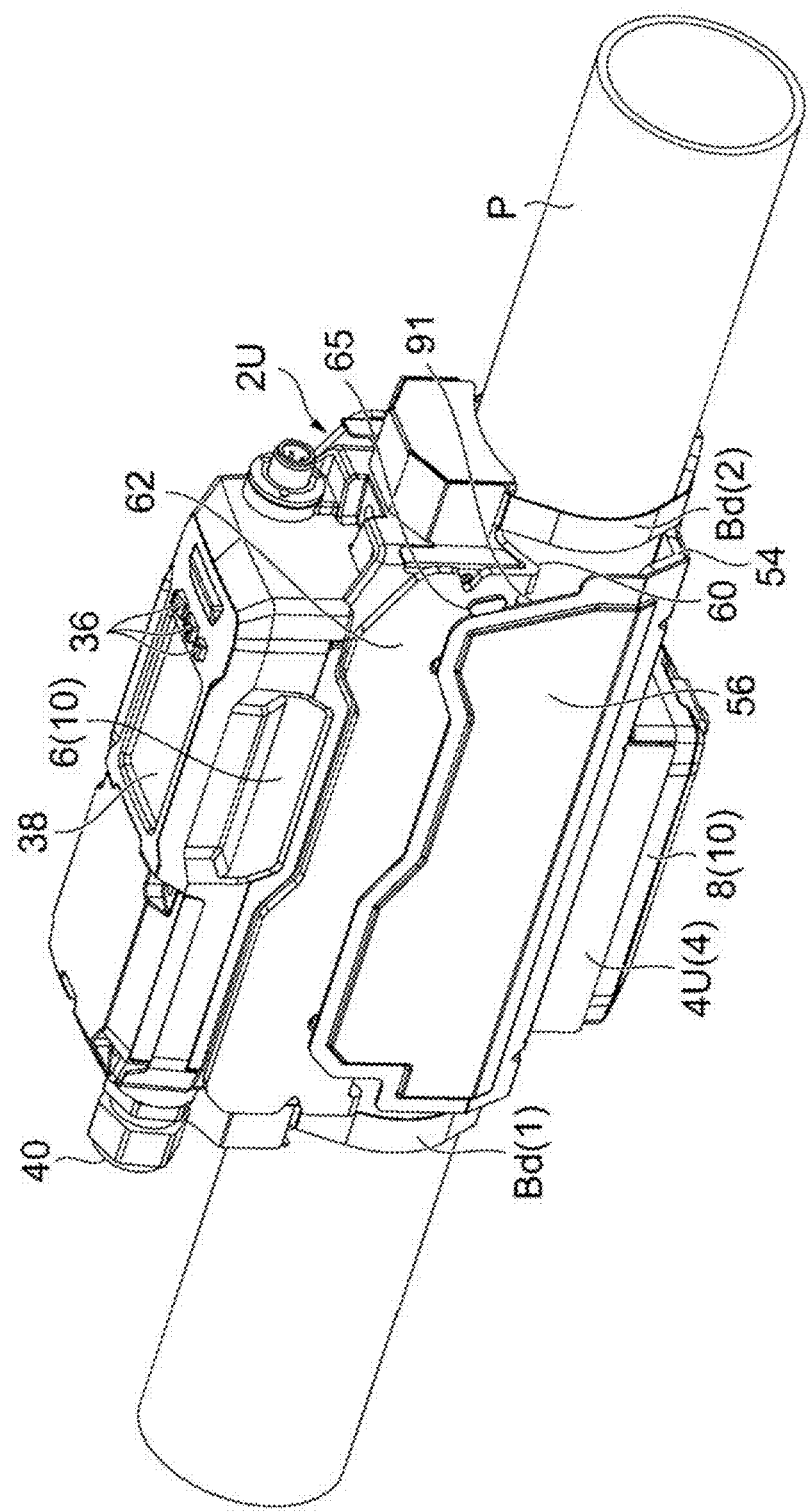
FIG. 32 is a perspective view of an ultrasonic flow sensor according to a first modification.

Examples of the guide portions also include another configuration in which projecting pins are provided on the first arm portions 304, and inclined walls (walls inclined with respect to the axial direction of the piping) are provided at ends of the second arm portions 404, and relative positioning between the first fitting 300 and the second fitting 400 are guided by moving the first fitting 300 and the second fitting 400 along the axial direction of the piping until the projecting pins are abutted against and stopped by the inclined walls (detailed description will be given later with reference to FIG. 32).

The above-described "guide portions" may also be referred to as an "information conversion mechanism" configured to convert the diameter of the piping into a distance between the first sensor unit and the second sensor unit in the axial direction of the piping. Typical examples of the "information conversion mechanism" include slits extending so as to be inclined from the diameter direction of the piping P toward a longitudinal direction of the piping P and pins positioned in the inclined slits as will be described later with reference to FIG. 1 or the like.

FIG. 39 illustrates another specific example included in the invention. A point different from FIG. 38 is that a pair of second arm portions 454 provided on a lower side in the drawing extend in a direction away from the first unit housing case 510. In other words, in FIG. 38, the pair of first arm portions 304 extend downward in the drawing in FIG. 38, while the pair of second arm portions 404 extend upward in the drawing, so that the overlapped portions OL are formed in the vicinity of an intermediate position between the first unit housing case 510 and the second unit housing case 520. In contrast, in FIG. 39, a pair of first arm portions 354 extend downward in the drawing, and the pair of second arm portions 454 also extend downward in the drawing, so that the overlapped portions OL are formed at positions in the vicinity of the second unit housing case 520 rather than in the vicinity of the intermediate position between the first unit housing case 510 and the second unit housing case 520. In this manner, in the ultrasonic flow sensor according to the embodiment, at least one of the first arm portions 354 and the second arm portions 454 needs to extend so as to hold the piping P therebetween.

In FIG. 39, reference sign 350 indicates a first fitting, and reference numeral 450 indicates a second fitting. The first and second fittings 350 and 450 are used for attaching the first unit housing case 510 configured to accommodate the first sensor unit and the second unit housing case 520 configured to accommodate the second sensor unit on the peripheral surface of the piping P.

A first position regulating portion 352 of the first fitting 350 includes a pair of projection ridges 352a (preferably, rod members having a circular cross section) extending in the longitudinal direction of the piping P, and the pair of ridges 352a come into contact with the piping P to align the orientation of the first unit housing case 510 with the diameter direction DM of the piping P and the axial direction of the piping P.

A second position regulating portion 452 of the second fitting 450 includes a pair of projection ridges 452a (preferably, rod members having a circular cross section) extending in the longitudinal direction of the piping P, and the pair of projection ridges 452a come into contact with the piping P to align the orientation of the second unit housing case 520 with the diameter direction Dm of the piping P and the axial direction of the piping P.

The first and second fittings 350 and 450 include the pair of first and second arm portions 354 and 454 extending respectively from a distal end portion of the first position regulating portion 352 and a distal end portion of the second position regulating portion 452. The overlapped portions OL are provided with the above-described guide portions (or information conversion mechanisms).

In the embodiments illustrated in FIG. 38 and FIG. 39, both the first and second arm portions 304 (354) and 404 (454) of the first and second fittings 300 (350) and 400 (450) have a molded shape. As a modification, a configuration in which one of the first and second arm portions 304 (354) and 404 (454) have a molded shape and the other one of those have bendable circumferentially around the piping P is also applicable. In the embodiment of the invention illustrated in FIG. 38 and FIG. 39, the pairs of first arm portions 304 and 354 extend respectively from distal end portions of the first position regulating portions 302 and 352 and the pairs of second arm portions 404 and 454 extend from the distal end portions of the second position regulating portions 402 and 452. However, according to the invention, the pairs of first arm portions 304 and 354 and the pairs of second arm portions 404 and 454 do not necessarily have to extend from the distal end portions of the first position regulating portions 302 and 352 or the distal end portions of the second position regulating portions 402 and 452.

For example, the pairs of arm portions may extend from proximal ends of the first position regulating portions 302 and 352 or the second position regulating portions 402 and 452 or may extend from predetermined positions (for example, the intermediate positions) between the proximal end and the distal end. In addition, the pairs of arm portions of the invention do not have to extend from the first position regulating portions 302 and 352 or the second position regulating portions 402 and 452. For example, the pairs of arm portions may extend from the first unit housing case 510 or the second unit housing case 520 instead of extending from the first position regulating portion or the second position regulating portion.

In other words, when considering the first unit housing case 510 and the first position regulating portions 302 and 352 as the "first housing portion" as described above, the arm portions may simply extend from the "first housing portion" as the proximal end. In other words, when considering the second unit housing case 520 and the second position regulating portions 402 and 452 as the "second housing portion" as described above, the arm portions may simply extend from the "second housing portion" as the proximal end.

Moreover, not necessarily both of the proximal ends of the pairs of the arm portions of the invention have to be the "first housing portion". For example, one of the proximal ends of the pair of arm portions is configured as the "first housing portion", and the other proximal end may be configured as the "second housing portion".

Referring now to FIG. 38 and FIG. 39, the first and second fittings 300 (350) and 400 (450) are illustrated in the drawings to be lateral symmetry. However, lateral asymmetry is also applicable when applying the invention as immediately understood from FIG. 40.

FIG. 40 illustrates a specific example that one of the proximal ends of the pair of arm portions is configured as the "first housing portion", and the other proximal end is configured as the "second housing portion". In FIG. 40, reference sign 360 indicates a first fitting, and reference numeral 460 indicates a second fitting. The first and second fittings 360 and 460 are used for attaching the first unit housing case 510 configured to accommodate the first sensor unit and the second unit housing case 520 configured to accommodate the second sensor unit on the peripheral surface of the piping P.

A first position regulating portion 362 of the first fitting 360 includes a pair of plate members having a truncated chevron shape and extending in the longitudinal direction of the piping P, and the plate members come into contact with the piping P at the plurality of positions CL (1), so that the orientation of the first unit housing case 510 is aligned with the diameter direction Dm of the piping P and the axial direction of the piping P. A second position regulating portions 462 of the second fitting 460 includes a pair of plate members having a truncated chevron shape and extending in the longitudinal direction of the piping P, and the plate members come into contact with the piping P at the plurality of positions CL(2), so that the orientation of the second unit housing case 520 is aligned with the diameter direction Dm of the piping P and the axial direction of the piping P. Here, in FIG. 40, a first arm portion 364 extends from the first unit housing case 510 instead of extending from the first position regulating portion 362 as illustrated in FIG. 38 and FIG. 39. A second arm portion 464 extends from the second unit housing case 520 instead of extending from the second position regulating portion 462 as illustrated in FIG. 38 and FIG. 39. Accordingly, the "pair of" arm portions are formed by the two first arm portion 364 and the second arm portion 464 having different proximal ends, that is, between the first and second fittings 360 and 460.

In FIG. 40, guide portions that guide relative positioning between the first fitting 360 and the second fitting 460 in the axial direction of the piping depending on the diameter of the piping are provided on overlapped portions G between a distal end portion of the first arm portion 364 and the second unit housing case 520, and between a distal end portion of the second arm portion 464 and the first unit housing case 510. For example, with the configuration in which projecting pins provided on the first unit housing case 510 and on the second unit housing case 520 (that is, the "first housing portion" and the "second housing portion") are slidable along slit-like guide grooves provided on the distal end portions of the first arm portion 364 and the second arm portion 464 to guide the relative positioning between the first fitting 360 and the second fitting 460.

Examples of the guide portions include another configuration in which marks for guiding relative positioning between the first fitting 360 and the second fitting 460 in the axial direction of the piping are formed on the first and second unit housing cases 510 and 520, and slits inclined with respect to the axial direction of the piping are formed on the first arm portion 364 and the second arm portion 464, so that relative position between the first fitting 360 and the second fitting 460 are adjusted while visually checking the marks through the slits. The slits to be formed on the first arm portion 364 and the second arm portion 464 do not necessarily have to be inclined. For example, the plurality of slits extending in the diameter direction of the piping may be arranged along the axial direction of the piping, and the respective slits are coupled to each other in the axial direction of the piping. In other words, slits having a staircase shape when viewing the first arm portion 364 and the second arm portion 464 from the side are formed. Accordingly, the relative position between the first fitting 360 and the second fitting 460 in the axial direction of the piping may be adjusted for the piping having a large diameter and the piping having a small diameter.

As described above, the embodiment of the invention may have various modes. Further specified examples will be described with reference to the drawings such as FIG. 1.

First Embodiment (FIG. 1 to FIG. 11)

A first embodiment is typically is an ultrasonic flow sensor system 1 suitable for the Z-shaped arrangement. The ultrasonic flow sensor system 1 includes first and second fittings 2 and 4 so that first and second sensor units 6 and 8 may be attached to a peripheral surface of piping P by using these two fittings 2 and 4. The first and second fittings 2 and 4 are molds and specifically, metallic press molds. The first and second sensor units 6 and 8 constitute an ultrasonic flow sensor 10. The diameter of the piping P and the fluid flowing in the piping P are not specifically limited for the application of the first embodiment. However, a typical example of application will be listed below.
(1) Diameter of Piping P: approx. 44 mm to approx. 100 mm (suitable diameter of the piping P: approx. 48 mm to approx. 90 mm).
(2) Material of Piping P: steel, SUS, copper, polyvinyl Chloride (PVC)

(3) Fluid: water, oil, drug solution, antifreeze (ethylene glycol), coolant

The ultrasonic flow sensor system 1 including the first and second fittings 2 and 4 is configured to be capable of automating various types of positioning relating to the first and second sensor units 6 and 8 to be installed on a peripheral surface of the piping P having given diameter as listed below.

(a) Positioning of the first sensor unit 6 may be automatically achieved by fixing the first fitting 2 to the piping P. With this positioning, the first sensor unit 6 may be oriented in the diameter direction passing through the center of the piping P. (Positioning of First sensor unit 6 in the diameter direction)

(b) Positioning of the second sensor unit 8 may be automatically achieved by fixing the second fitting 4 to the piping P. With this positioning, the second sensor unit 8 may be oriented in the diameter direction passing through the center of the piping P. (Positioning of Second sensor unit 8 in the diameter direction)

(c) The longitudinal axis of the first fitting 2 may be automatically aligned with a first mother line GL1 by fixing the first fitting 2 to the piping P.

(d) The longitudinal axis of the second fitting 4 may be automatically aligned with a second mother line GL2 by fixing the second fitting 4 to the piping P.

(e) The first and second fittings 2 and 4 have a function to convert first information to second information, and the information conversion mechanism is achieved by cooperation of the first and second fittings 2 and 4. The first information is information on the diameter of the piping P. The second information is information on adequate distance between the first and second fittings 2 and 4 along the direction of the longitudinal axis of the piping P. (Proper Calculation of Distance between first and second sensor units 6 and 8 in the axial direction)

(f) In this manner, when the first and second fittings 2 and 4 are fixed to the piping P, the longitudinal axes of the first and second fittings 2 and 4 are automatically aligned with the first mother line GL1 and the second mother line GL2 respectively. The first and second fittings 2 and 4 have a function to position the first sensor unit 6 on the first mother line GL1 (FIG. 3) and position the second sensor unit 8 on the second mother line GL2 (FIG. 3) at an adequate distance from the first sensor unit 6 in the axial direction of the piping P due to interaction therebetween.

In other words, assembly of the first and second sensor units 6 and 8 to the piping P using the first and second fittings 2 and 4 may be figured out in the following three phases.

A first phase includes steps (a) and (b), and steps (c) and (d) described above. The first phase includes positioning of the first and second fittings 2 and 4 in the diameter direction of the piping P by pressing the first and second fittings 2 and 4 against the piping P (steps (a) and (b)), then aligning the orientation in the longitudinal direction of the first and second fittings 2 and 4 with the axial direction of the piping P (steps (c) and (d)).

A second phase includes the step (e) described above. The second phase includes sliding the first and second fittings 2 and 4 in the axial direction of the piping P by using the guide portion or the information conversion mechanism, thereby adjusting the relative position between the first and second fittings 2 and 4 in the axial direction of the piping P.

A third phase includes the step (f) described above. The third phase includes fixing the first and second fittings 2 and 4 to the piping P with a band. The band may be a band which binds the first and second fittings 2 and 4 together or may be bands which fix the first fitting 2 and the second fitting 4 individually and independently. With the third phase, the relative positioning between the first and second fittings 2 and 4 in the axial direction of the piping P is achieved.

Figure 4:
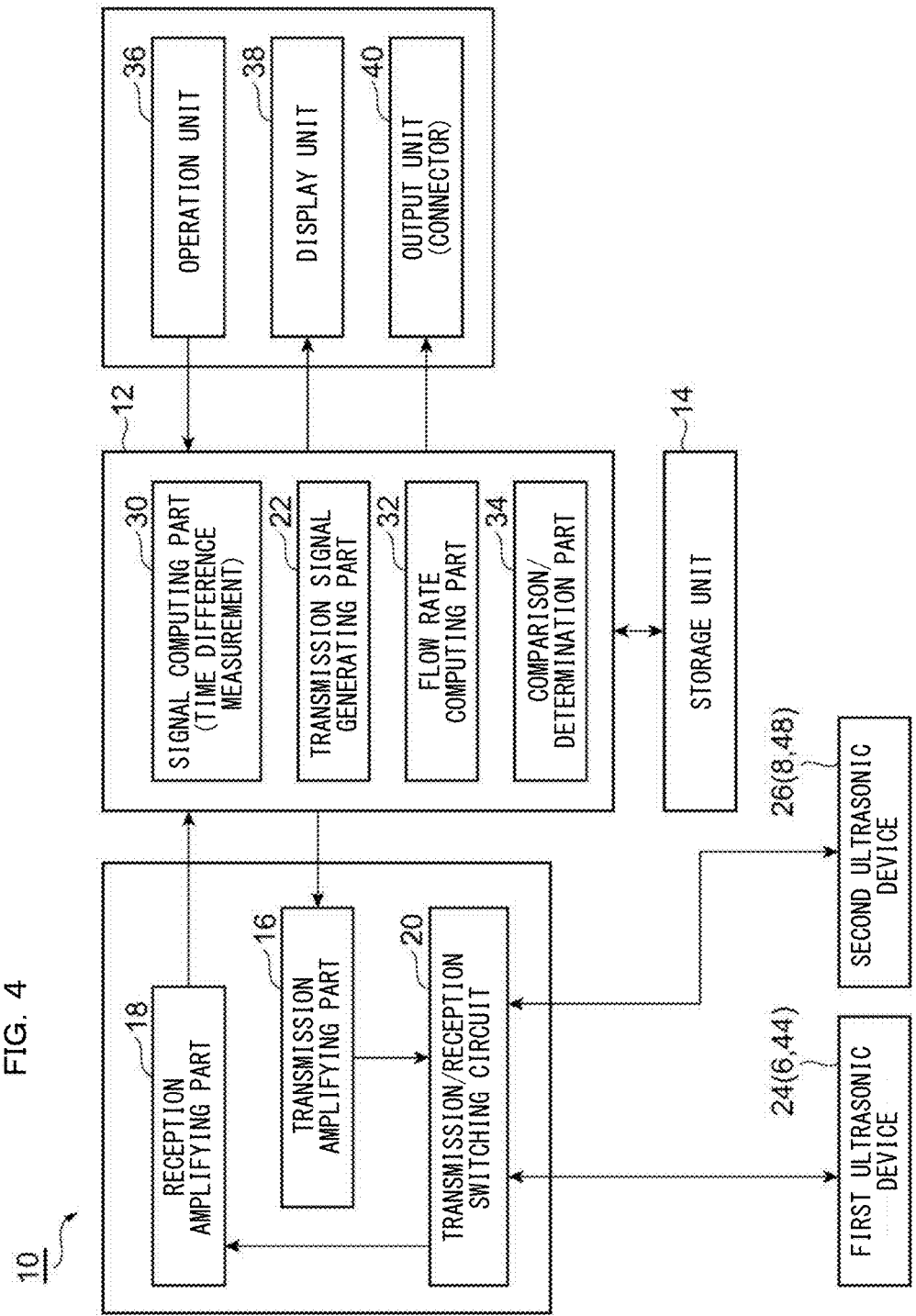
FIG. 4 is a functional bock diagram of an ultrasonic flow sensor included in the ultrasonic flow sensor system of the first embodiment illustrated in FIG. 1.

FIG. 4 is a functional block diagram of the ultrasonic flow sensor 10. Referring to FIG. 4, the ultrasonic flow sensor 10 includes a control unit 12, and also includes a storage unit 14, a transmission amplifying part 16, and a reception amplifying part 18. The transmission amplifying part 16 and the reception amplifying part 18 are connected to a transmission/reception switching circuit 20.

An analogue signal generated by a transmission signal generating part 22 included in the control unit 12 is supplied to first and second ultrasonic devices 24 and 26 through the transmission amplifying part 16 and through the transmission/reception switching circuit 20, and then the first and second ultrasonic devices 24 and 26 generate ultrasonic wave. The first ultrasonic device 24 is included in the first sensor unit 6. The second ultrasonic device 26 is included in the second sensor unit 8.

The ultrasonic wave generated from the first sensor unit 6 (first ultrasonic device 24) enters a fluid flowing in the piping P. The ultrasonic wave propagated in the fluid is received by the second sensor unit 8 (second ultrasonic device 26), and the second ultrasonic device 26 outputs an analogue signal based on the received ultrasonic wave. The analogue signal output from the second ultrasonic device 26 is supplied to the reception amplifying part 18 through the transmission/reception switching circuit 20.

The reception amplifying part 18 amplifies the analogue signal received from the transmission/reception switching circuit 20 and converts the amplified analogue signal to a digital signal by an A/D conversion circuit. The digital signal is supplied to the control unit 12.

Figure 1:
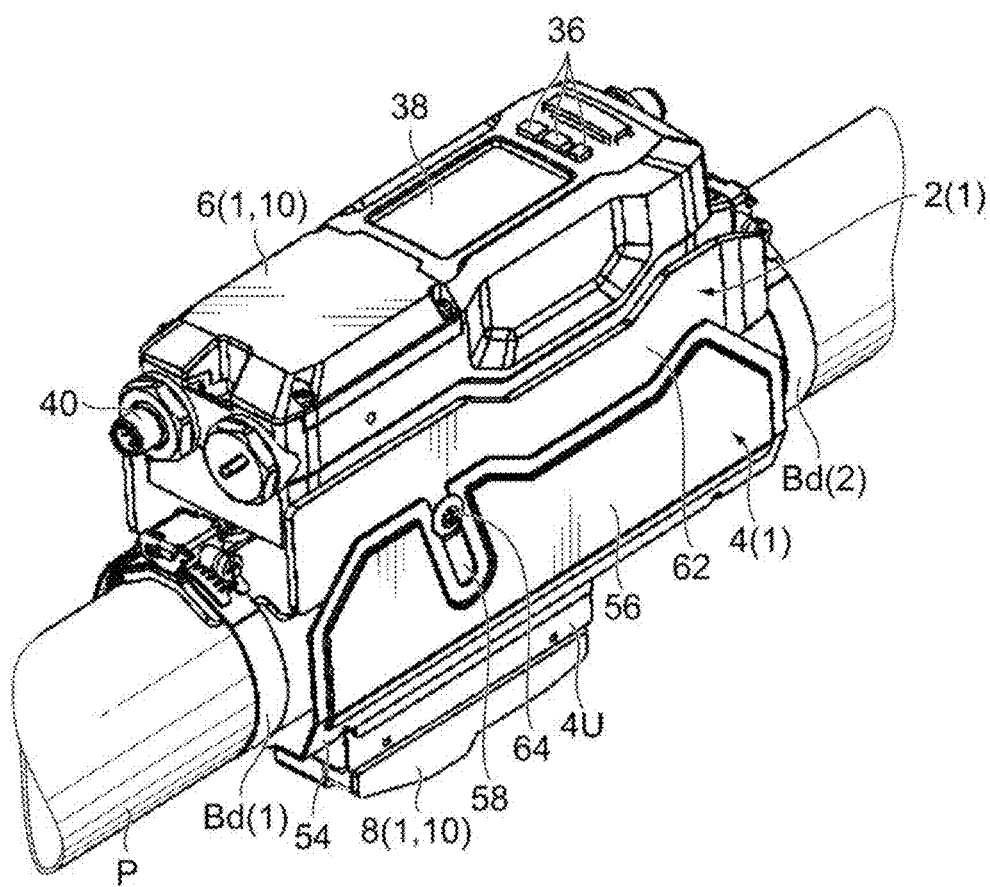
FIG. 1 is a perspective view of an ultrasonic flow sensor system of a first embodiment installed on piping.
Figure 3:
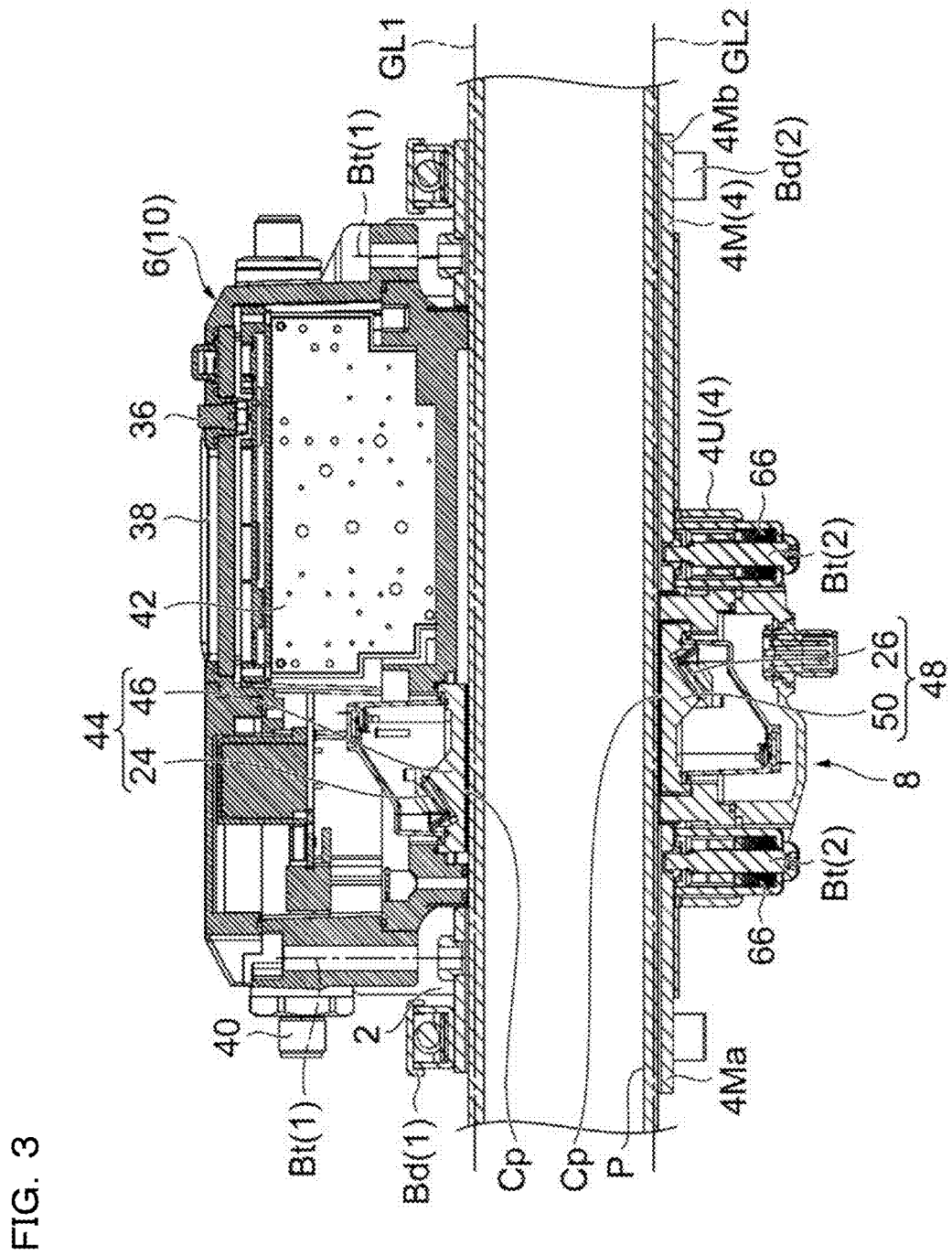
FIG. 3 is a cross-sectional view of the ultrasonic flow sensor system of the first embodiment illustrated in FIG. 1.

On the other hand, the ultrasonic wave generated by the second sensor unit 8 (second ultrasonic device 26) enters the fluid passing through the piping P (FIG. 1 and FIG. 3). The ultrasonic wave propagated in the fluid is received by the first sensor unit 6 (first ultrasonic device 24), and the first ultrasonic device 24 outputs an analogue signal based on the received ultrasonic wave. The analogue signal output from the first ultrasonic device 24 is supplied to the reception amplifying part 18 through the transmission/reception switching circuit 20.

The reception amplifying part 18 amplifies the analogue signal received from the transmission/reception switching circuit 20 and converts the amplified analogue signal to a digital signal by an A/D conversion circuit. The digital signal is supplied to the control unit 12.

The control unit 12 executes a program stored in the storage unit 14 to realize functions of a signal computing part 30, a flow rate computing part 32, and a comparison/determination part 34. The signal computing part 30 measures time difference $\Delta t$ based on the digital signal provided by the reception amplifying part 18. The time difference $\Delta t$ is a difference between a time t1 required until ultrasonic wave output from the first ultrasonic device 24 is received by the second ultrasonic device 26 and a time t2 required until the ultrasonic wave output from the second ultrasonic device 26 is received by the first ultrasonic device 24. The flow rate computing part 32 computes a velocity of the fluid flowing in the piping P based on a predetermined expression based on the time difference $\Delta t$ measured by the signal computing part 30 and computes a flow rate of the fluid based on another predetermined expression.

In other words, based on output signals from the first ultrasonic device 24 and the second ultrasonic device 26, the flow rate of the fluid in the piping P is calculated by obtaining the time difference Δt between times required for the ultrasonic wave to propagate from an upstream side to a downstream side and from the downstream side to the upstream side of the fluid flowing in the piping P.

The ultrasonic flow sensor 10 includes an operation unit 36 such as a button operated by a user and a display unit 38 including 7-segment LED and a thin display device, and also includes an output unit 40 such as a connector which constitutes an interface with respect to an external apparatus.

A control output based on a preset threshold value (set value) is output to a display of the display unit 38 or to the external apparatus through the output unit 40. In other words, an ON/OFF signal relating to the detected flow rate of the fluid flowing in the piping P is output based on comparison with respect to a predetermined flow rate threshold value. A pulse is output at every integration flow rate. For example, a digital output of a flow rate measurement value is supplied through communication.

Which of the first and second sensor units 6 and 8 is to be mounted with the components described above is arbitrary. A main substrate 42 (FIG. 3) is mounted on the first sensor unit 6 illustrated in FIG. 1 to FIG. 3, and the control unit 12 and the storage unit 14 are mounted on the main substrate 42. The operation unit 36 which constitutes a user interface, the display unit 38 including the 7-segment LED and the thin display device, and the output unit 40 such as a connector which constitutes the interface with respect to the external apparatus are mounted on the first sensor unit 6 (FIG. 1).

Referring now to FIG. 3, a first sensor portion 44 integrated in the first sensor unit 6 includes the above-described first ultrasonic device 24 and a first wedge member 46. A second sensor portion 48 integrated in the second sensor unit 8 includes the above-described second ultrasonic device 26 and a second wedge member 50. The first sensor portion 44 and the second sensor portion 48 are positioned in a state of being in press contact with a peripheral surface of the piping P as clearly understood from FIG. 3. Preferably, acoustic coupling media, that is, couplants Cp are interposed between the second sensor portion 48 and the piping P, and the first sensor portion 44 and the piping P. The couplant Cp is preferably a solid body (for example, an elastic couplant, that is, a rubber sheet), but may be a fluid body such as grease.

Figure 5:
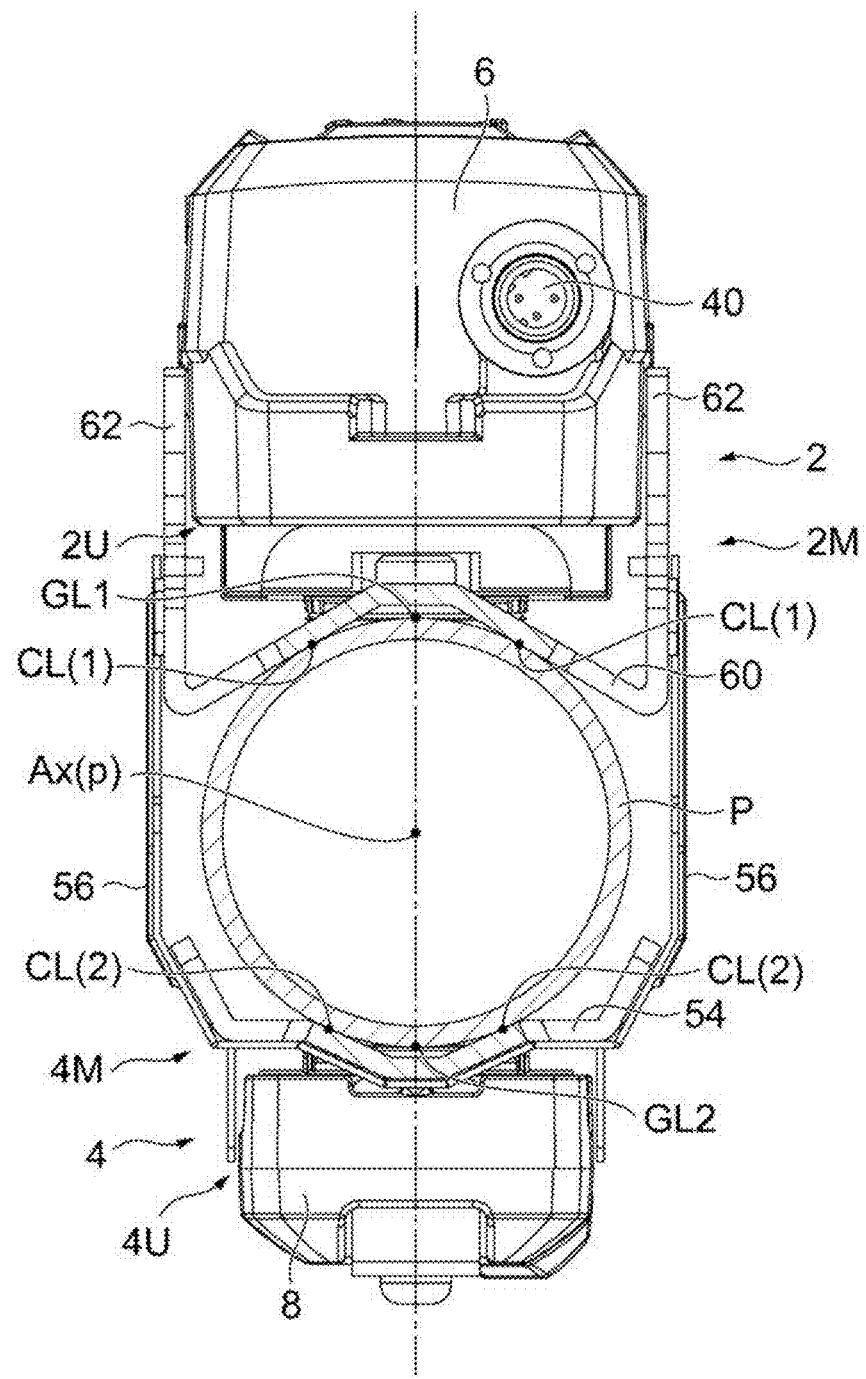
FIG. 5 is a cross-sectional view of the ultrasonic flow sensor system illustrated in FIG. 1 and FIG. 2.
Figure 6:
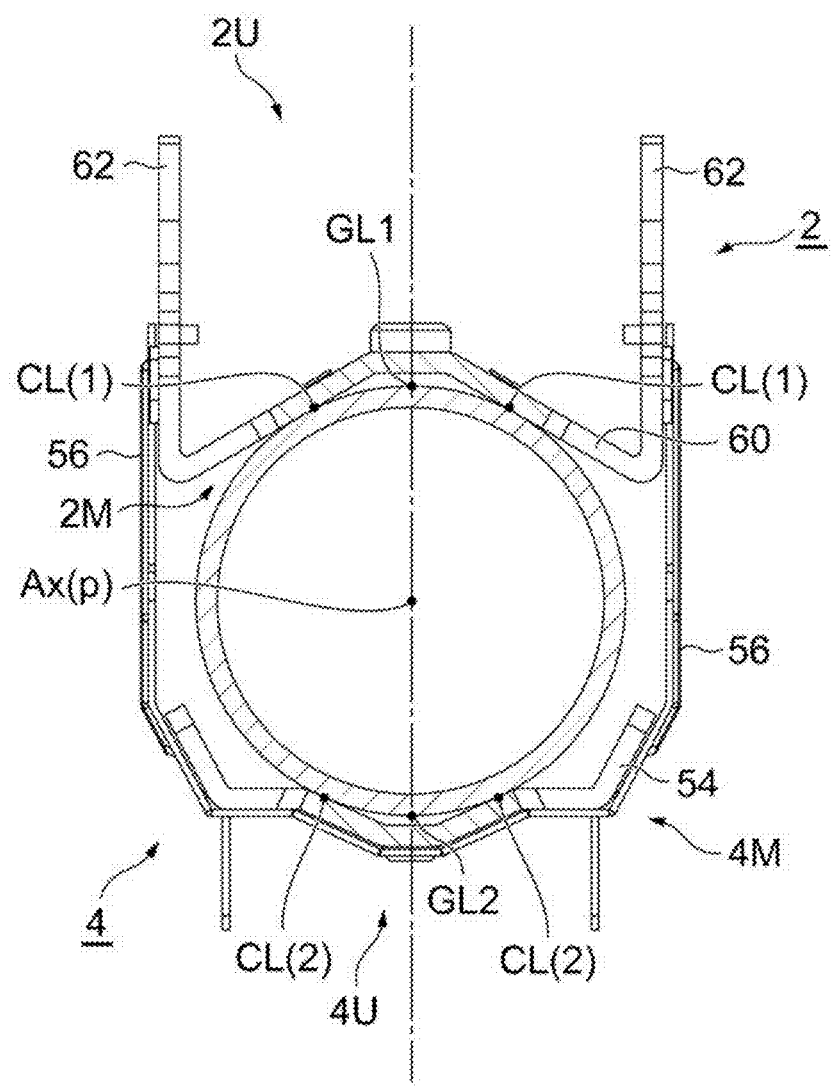
FIG. 6 is a cross-sectional view of the ultrasonic flow sensor system illustrated in FIG. 5 with first and second sensor units are omitted.
Figure 7:
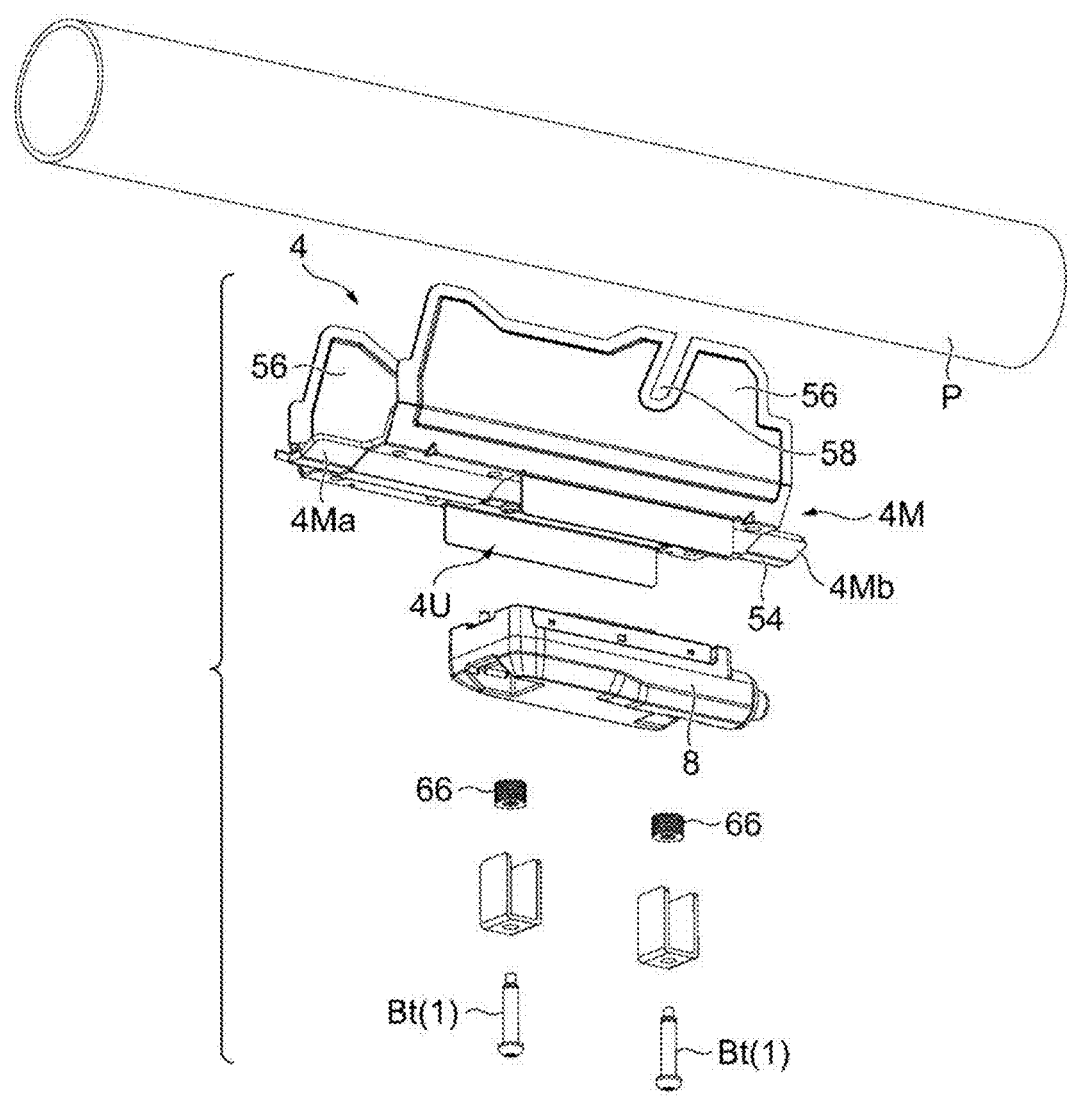
FIG. 7 is an exploded perspective view of a second fitting and the second sensor unit included in the ultrasonic flow sensor system of the first embodiment illustrated in FIG. 1.

FIG. 5 is a cross-sectional view illustrating a state in which the first and second sensor units 6 and 8 are fixed to the piping P with the first and second fittings 2 and 4. FIG. 6 is a drawing from which the first and second sensor units 6 and 8 are omitted from FIG. 5. FIG. 7 is an exploded perspective view of the second fitting 4 and the second sensor unit 8. Referring now to FIG. 5 to FIG. 7, the second fitting 4 includes a second fitting portion 4M to be fitted to the piping P and a second unit housing portion 4U configured to receive the second sensor unit 8. The second fitting portion 4M has a length extending along the direction of a longitudinal axis Ax(p) of the piping P and one end portion 4Ma and the other end portion 4Mb of the second fitting portion 4M are fixed to the piping P by using first and second bands Bd(1) and Bd(2) as the most clearly understood from FIG. 2. The first and second bands Bd(1) and Bd(2) are wound around the piping P in the circumferential direction in a state of respectively binding the one end portion 4Ma and the other end portion 4Mb. Each of the bands Bd(1) and Bd(2) is placed around the piping P by a fixing member 52 (FIG. 2) in a ring shape, and each of the bands Bd(1) and Bd(2) may be tensed up and be maintained in the tensed-up state by tightening a screw 52a (FIG. 2) of the fixing member 52.

The second fitting portion 4M of the second fitting 4 includes a second position regulating portion 54. A cross-sectional shape of the second position regulating portion 54 will be described later. The second fitting 4 includes a pair of second arm portions 56 extending from both side edge of the second position regulating portion 54 so as to facing each other.

Figure 2:
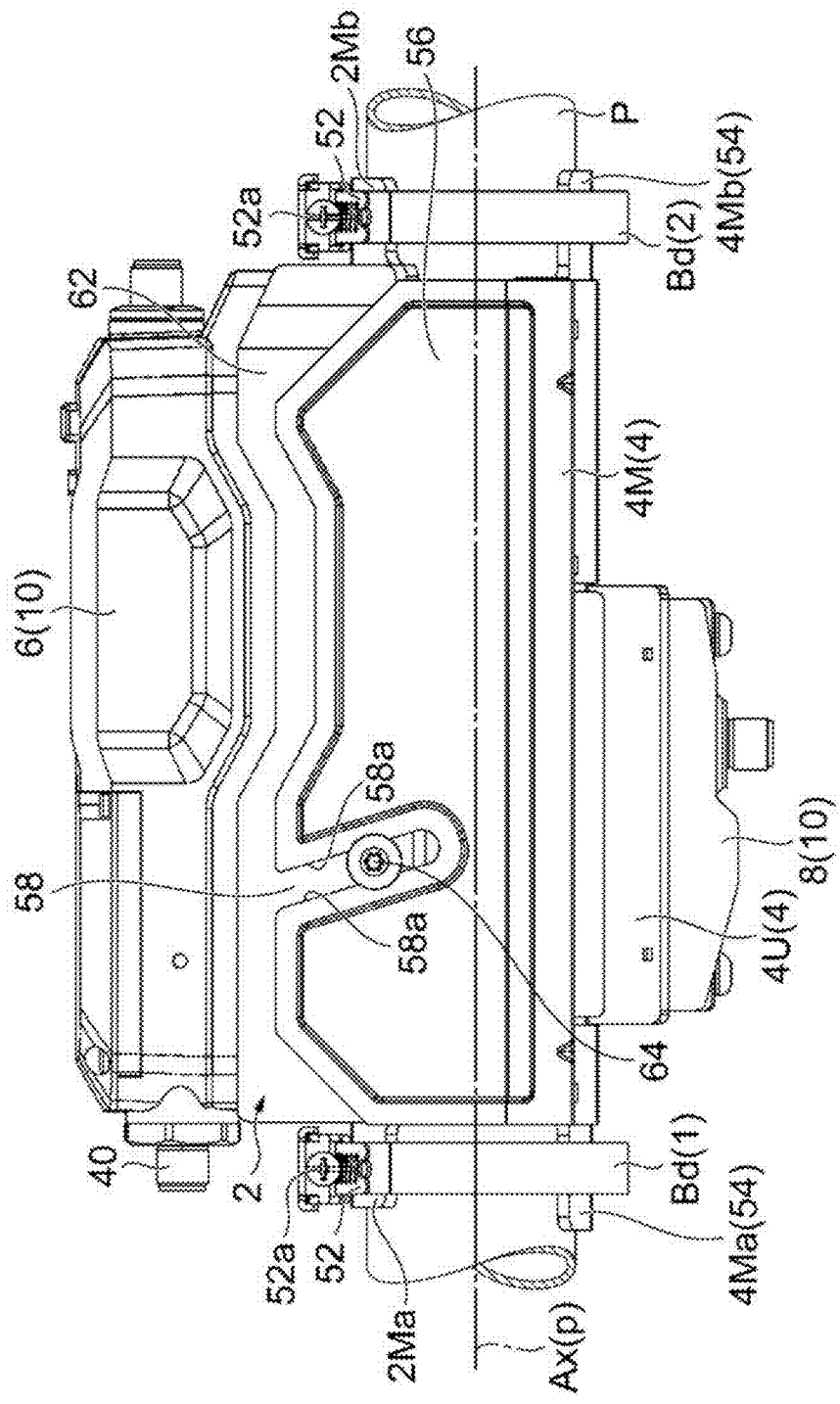
FIG. 2 is a side view of the ultrasonic flow sensor system of the first embodiment illustrated in FIG. 1.

Referring to FIG. 2 and FIG. 7, as a typical example, the one end portion 4Ma and the other end portion 4Mb of the second fitting portion 4M are positioned apart from each other in the longitudinal direction and constitute the second position regulating portion 54. The second position regulating portion 54 typically includes a shape coming into contact with the piping P at two positions CL(2) and CL(2) on circular cross section thereof (FIG. 5 and FIG. 6). The contact positions CL(2) extend parallel to the direction of the longitudinal axis Ax(p) of the piping P.

When the second fitting 4 is attached to the piping P, the second fitting 4 comes into contact with the piping P at least at two positions CL(2) with the second sensor unit 8, that is, the second mother line GL2 interposed therebetween when viewing the piping P in cross section. Accordingly, the second sensor unit 8 is aligned with the second mother line GL2 (FIG. 3), and simultaneously, the second sensor unit 8 is oriented to the diameter direction passing the center of the piping P. In other words, the direction of the longitudinal axis of the second fitting 4 is aligned with the second mother line GL2 of the piping P by fixing the second fitting 4 to the piping P with the second position regulating portion 54.

The second position regulating portion 54 preferably has a symmetrical shape in a cross-section along a direction crossing across the piping P with respect to the second mother line GL2 (FIG. 3) as clearly understood from FIG. 5 and FIG. 6, and preferably, has a shape which comes into contact with the piping at positions at the same distance apart from the second mother line GL2. Typically, the second position regulating portion 54 preferably has a shape having a pair of molded inclined wing portions extending toward one side and the other side with respect to the second mother line GL2 at a predetermined angle.

The second arm portions 56 of the second fitting portion 4M have a shape extending from both sides of the second position regulating portion 54 along the both sides of the piping P. Each of the second arm portions 56 includes an inclined slit 58 (FIG. 2 and FIG. 7), and the slit 58 is defined by a pair of inclined edges 58a and 58a extending in parallel to each other.

Figure 8:
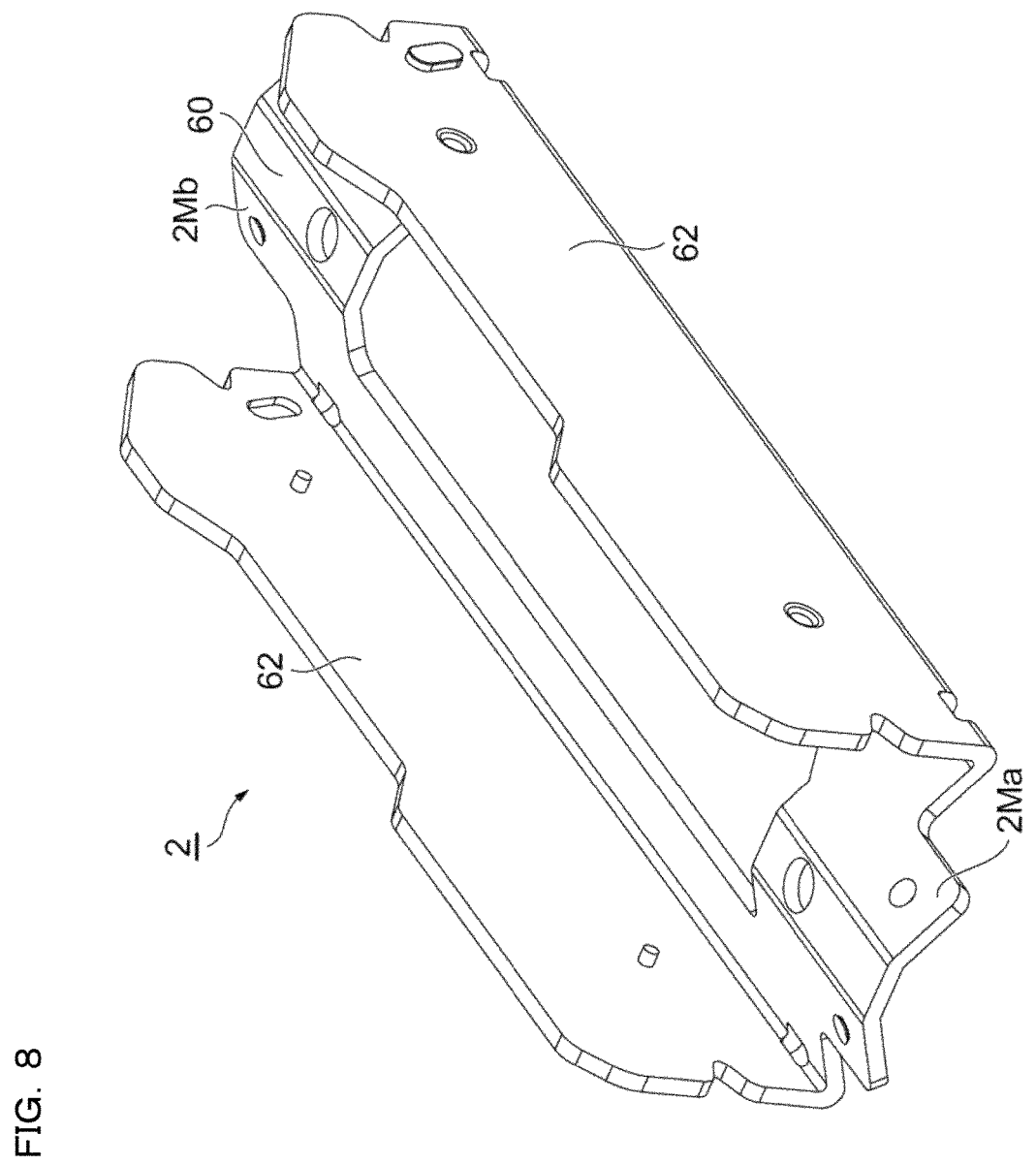
FIG. 8 is a perspective view of a first fitting included in the ultrasonic flow sensor system of the first embodiment.
Figure 9:
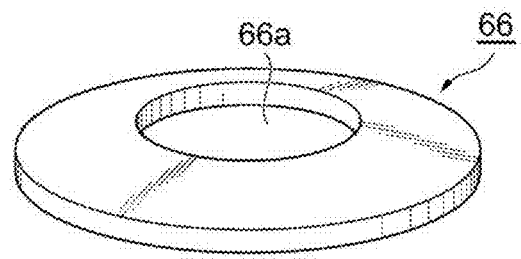
FIG. 9 is an explanatory drawing illustrating a disc spring integrated in the second fitting of the ultrasonic flow sensor system of the first embodiment.

Referring to FIG. 8, the first fitting 2 will be described. The first fitting 2 includes a first fitting portion 2M to be fitted to the piping P, and a first unit housing portion 2U for receiving the first sensor unit 6. The first fitting portion 2M has a length extending along the direction of the longitudinal axis Ax(p) of the piping P, and one end portion 2Ma and the other end portion 2Mb of the first fitting portion 2M are fixed to the piping P by using the aforesaid first and second bands Bd(1) and Bd(2) as the most clearly understood from FIG. 2. In other words, the first and second bands Bd(1) and Bd(2) are used for fixing the first fitting 2 and the second fitting 4 together to the piping P. However, the first fitting 2 and the second fitting 4 may be fixed to the piping P by using different bands from each other.

The first fitting portion 2M of the first fitting 2 includes a first position regulating portion 60 (FIG. 8). Referring to FIG. 5 and FIG. 6, the first position regulating portion 60 typically has a shape coming into contact with the piping P at two positions CL(1) on the circular cross section thereof. In other words, when the first fitting 2 is attached to the piping P, the first fitting 2 comes into contact with the piping P at least at two positions CL (1) with the first sensor unit 6 interposed therebetween when viewing a cross-section of the piping P. Accordingly, the first sensor unit 6 is aligned with the first mother line GL1, and simultaneously, the first sensor unit 6 is oriented to the diameter direction passing the center of the piping P. In other words, the direction of the longitudinal axis of the first fitting 2 is aligned with the first mother line GL1 of the piping P by fixing the first fitting 2 to the piping P with the first position regulating portion 60.

Referring to FIG. 5, FIG. 6, and FIG. 8, the first fitting 2 includes a pair of first arm portions 62 extending from both side edge of the first position regulating portion 60 so as to facing each other. The first arm portions 62 have a wing shape formed by molding in the same manner as the second arm portions 56 of the second fitting 4 described above. The first arm portions 62 extend in a direction apart from the piping P in the diameter direction, and the first sensor unit 6 is accommodated in a space interposed between the pair of first arm portions 62. The first arm portions 62 overlap with the second arm portions 56 partly in an adjacent state. The first arm portions 62 are fixedly provided with pins 64, and the second arm portions 56 are provided with the inclined slits 58 at overlapped portions between the first and second arm portions 62 and 56. The inclined slit 58 extends so as to incline from a diameter direction Dm of the piping P to the longitudinal direction of the piping P. The width of the inclined slit 58 is uniform from an entry to a bottom of the slit 58 in the longitudinal direction.

In the Z-shaped arrangement, the first sensor unit 6 and the second sensor unit 8 are disposed respectively on the first mother line GL1 and the second mother line GL2 opposing each other in the diameter direction passing through the center of the piping P (FIG. 3 and FIG. 5). Referring to FIG. 1 and FIG. 2, preferably the pair of inclined slits 58 of the molded second arm portions 56 of the second fitting 4 are symmetrically positioned with the intermediary of a plane including the first and second mother lines GL1 and GL2, and a pair of the pins 64 of the first fitting 2 are symmetrically positioned. The pins 64 are received respectively in the inclined slits 58 corresponding thereto. Preferably, the diameter of the pins 64 is substantially the same as the width of the inclined slits 58, and the pins 64 are movable in the inclined slits 58 by being guided by the inclined slits 58.

When the first and second sensor units 6 and 8 are attached to the piping P having a given diameter by using the first fitting 2 and the second fitting 4, the pins 64 of the first fitting 2 and the inclined slits 58 of the second fitting 4 constitute elements for realizing the information conversion mechanism. In other words, information on the diameter of the piping P is detected by the first and second fittings 2 and 4 positioned apart from each other in the diameter direction of the piping P, and the information on the diameter of the piping P is converted into information on an adequate distance between the first and second fittings 2 and 4 along the direction of the longitudinal axis Ax(p) of the piping P by the pins 64 movable in the inclined slits 58, so that the relative position of the first and second fittings 2 and 4 in the direction of the longitudinal axis Ax(p) of the piping P is determined, and the first and second fittings 2 and 4 are slid along the direction of the longitudinal axis Ax(p) of the piping P to position the first and second fittings 2 and 4. The information conversion mechanism is one of specific functions of the guide portions that guide the relative positioning between the first and second fittings 2 and 4 in the direction of the longitudinal axis Ax(p) of the piping P, and the configuration of the information conversion mechanism is one of specific configurations of the guide portions.

When applying the first and second fittings 2 and 4 to the piping P having a given diameter, the pair of first arm portions 62 of the first fitting 2 are preferably adjacent to and parallel to the pair of second arm portions 56 of the second fitting 4 corresponding thereto to realize the above information conversion mechanism smoothly. Further preferably, the pair of first arm portions 62 of the first fitting 2 are parallel to each other, and the pair of second arm portions 56 of the second fitting 4 are parallel to each other.

Referring to FIG. 2, as a typical example, at least two positions, namely, the one end portion 4Ma and the other end portion 4Mb of the second fitting portion 4M are positioned apart from each other in the longitudinal direction and constitute the second position regulating portion 54. However, the second position regulating portion 54 may be configured to be continuously positioned in the longitudinal direction of the second fitting portion 4M. Referring now to FIG. 6, the second position regulating portion 54 typically has a shape molded so as to come into contact with the piping P at the two positions CL(2) and CL(2) in the circular cross section of the piping P. In other words, when the second fitting 4 is attached to the piping P, the second fitting 4 comes into contact with the piping P at least at the two positions CL(2) in symmetry with respect to the second mother line GL2 (FIG. 3 and FIG. 5) when viewing the piping P in cross section. Accordingly, the second sensor unit 8 is aligned with the second mother line GL2, and simultaneously, the second sensor unit 8 is oriented to the diameter direction passing the center of the piping P. In other words, the direction of the longitudinal axis of the second fitting 4 is aligned with the second mother line GL2 of the piping P by fixing the second fitting 4 to the piping P with the second position regulating portion 54.

As described above, the second position regulating portion 54 of the second fitting 4 preferably has a symmetrical shape in a cross-section along a direction crossing across the piping P with respect to the second mother line GL2, and preferably, has a shape formed to come into contact with the piping at the positions CL(2) at the same distance apart from the second mother line GL2. Typically, the second position regulating portion 54 preferably has a shape having a pair of molded inclined wing portions extending toward one side and the other side with respect to the second mother line GL2 at a predetermined angle. This is the same for the first position regulating portion 60 of the first fitting 2.

When fixing the first fitting 2 and the second fitting 4 to the piping P, the following positioning is performed automatically.

(1) Paired combination between the inclined slits 58 and the pins 64 have functions for converting the first information to the second information as described above. The first information is information on the diameter of the piping P. The second information is information on a predetermined adequate distance between the first and second fittings 2 and 4 along the direction of the longitudinal axis of the piping P. Relative position between the first fitting 2 and the second fitting 4 facing each other with the piping P interposed therebetween is the information on the diameter of the piping P. The first information is converted into the second information by the pins 64 guided by the inclined slits 58 in the direction of the longitudinal axis Ax(p) of the piping P, and the second fitting 4 is positioned by an angle of inclination of the inclined slits 58, that is, by an angle from the diameter direction of the piping P at an adequate distance along the direction of the longitudinal axis Ax(p) of the piping P from the first fitting 2.

(2) The inclined slits 58 and the pins 64 are disposed respectively on the pair of first arm portions 62 and the pair of second arm portions 56 of the first and second fittings 2 and 4, which are molds, and the corresponding first and second arm portions 62 and 56 are positioned adjacently to each other. Therefore, even when the first and second fittings 2 and 4 are applied to piping P having different diameters, the aforesaid positioning in the diameter direction of the first and second sensor units 6 and 8 are maintained.

(3) The inclined slits 58 and the pins 64 are disposed respectively on the pair of first arm portions 62 and the pair of second arm portions 56 of the first and second fittings 2 and 4, which are molds, and the corresponding first and second arm portions 62 and 56 are positioned adjacently to each other. Therefore, even when the first and second fittings 2 and 4 are applied to piping P having different diameters, the positioning of the first and second sensor units 6 and 8 on the aforesaid first and second mother lines GL1 and GL2 (FIG. 3) are maintained.

Referring to FIG. 2 and FIG. 3, in the direction of the longitudinal axis Ax(p) of the piping P, one end portion and the other end portion of the first and second fittings 2 and 4 are tightened together by the first and second bands Bd(1) and Bd(2). The first fitting 2 and the second fitting 4 may be fixed to the piping P by using separate bands.

Referring continuously to FIG. 3, the first sensor unit 6 is fastened to the first fitting 2 by using first bolts Bt (1). The direction of tightening of the first bolts Bt(1) is a direction of press contact of the first sensor unit 6 with respect to the piping P, that is, the diameter direction of the piping P. Therefore, by tightening the first bolts Bt (1), the first sensor unit 6 is brought into press contact with the piping P.

The second sensor unit 8 is fastened to the second fitting 4 by using second bolts Bt(2). The direction of fastening of the second bolts Bt(2) is a direction of press contact of the second sensor unit 8 with respect to the piping P, that is, the diameter direction of the piping. Therefore, by tightening the second bolts Bt(2), the second sensor unit 8 is brought into press contact with the piping P.

As preferable mode, at least the second fitting 4 is provided with biasing members 66 that bias the second sensor unit 8 in the direction of coming into press contact with the piping P. In the first embodiment, the biasing members 66 include a plurality of disc springs (FIG. 9) arranged coaxially with the second bolts Bt(2). The disc spring 66 has a conical shape provided with a center hole 66a, and configured to generate a spring force by being applied with a load in the direction of reducing the height of the disc springs 66. In the first embodiment, a plurality of the disc springs 66 are disposed coaxially with each of the second bolts Bt(2). The first fitting 2 may also be provided with biasing members (disc springs) 66 configured to bias the first sensor unit 6 the direction of coming into press contact with the piping P.

Figure 10:
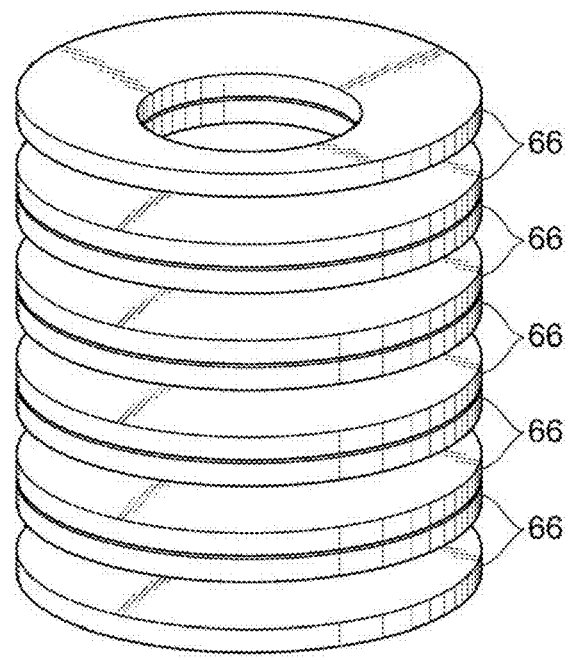
FIG. 10 is an explanatory drawing illustrating an example of an array of a plurality of the disc springs in a case where the plurality of disc springs illustrated in FIG. 9 are integrated in the second fitting.
Figure 11:
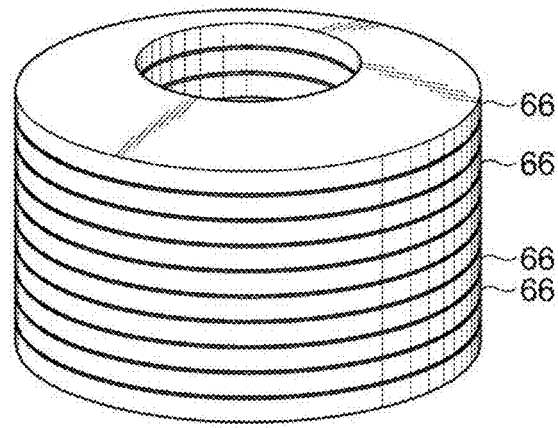
FIG. 11 is an explanatory drawing illustrating another example of an array of the plurality of disc springs in a case where the plurality of disc springs illustrated in FIG. 9 are integrated in the second fitting.

The plurality of disc springs 66 may be arranged in a first disc spring array in which every one or more disc springs are inverted upside down as illustrated in FIG. 10 or may be arranged in a second disc spring array in which all the plurality of disc springs are arranged in the same orientation without being inverted upside down as illustrated in FIG. 11.

By adding the biasing members 66 to the second fitting 4, the second fitting 4 and the first fitting 2 having the Z-shaped arrangement may be attached to the piping P in a state of facing one side of the piping P. Specific steps will be described below.

(Step 1) Assemble the second sensor unit 8 to the second fitting 4 (FIG. 5).

(Step 2) Assemble the first sensor unit 6 to the first fitting 2 in the same manner as in Step 1.

(Step 3) Provisionally fix the second fitting 4 having the second sensor unit 8 mounted thereon to the piping P, and provisionally fix the first fitting 2 having the first sensor unit 6 mounted thereon to the piping P in a state in which an operator faces the piping P. This provisional fixation may be performed by using the bands Bd(1) and Bd(2). In the state of being provisionally fixed, the second sensor unit 8 is in the state of being biased toward the peripheral surface of the piping P by the disc springs 66 of the second fitting 4. The second fitting 4 is positioned on the opposite side of the piping P when viewed from the operator.

(Step 4) Confirm that two pins 64 of the first fitting 2 are correctly positioned in two inclined slits 58 of the second fitting 4, then tighten the bands Bd(1) and Bd(2) firmly to fix the first and second fittings 2 and 4 to the piping P.

Accordingly, by the cooperation of the inclined slits 58 of the first fitting 2 and the pins 64 of the second fitting 4, the first sensor unit 6 is positioned on the first mother line GL1, and the second sensor unit 8 is positioned on the second mother line GL2. The first and second sensor units 6 and 8 are located apart from each other along the direction of the longitudinal axis Ax (p) of the piping P, and the distance is properly adjusted. The second sensor unit 8 is brought into a press contact state with respect to the peripheral surface of the piping P by the disc springs 66 of the second fitting 4.

Assembly of the first sensor unit 6 to the first fitting 2 in Step 2 may be performed after the step for fixing the first and second fittings 2 and 4 to the piping P in Step S4 described above. Fixing the first sensor unit 6 to the first fitting 2 by using the bolt Bt(1), a state in which the first sensor unit 6 is brought into a press contact with the piping P by the fixation of the bolt Bt(1) is achieved.

Second Embodiment (FIG. 12 to FIG. 22)

Figure 12:
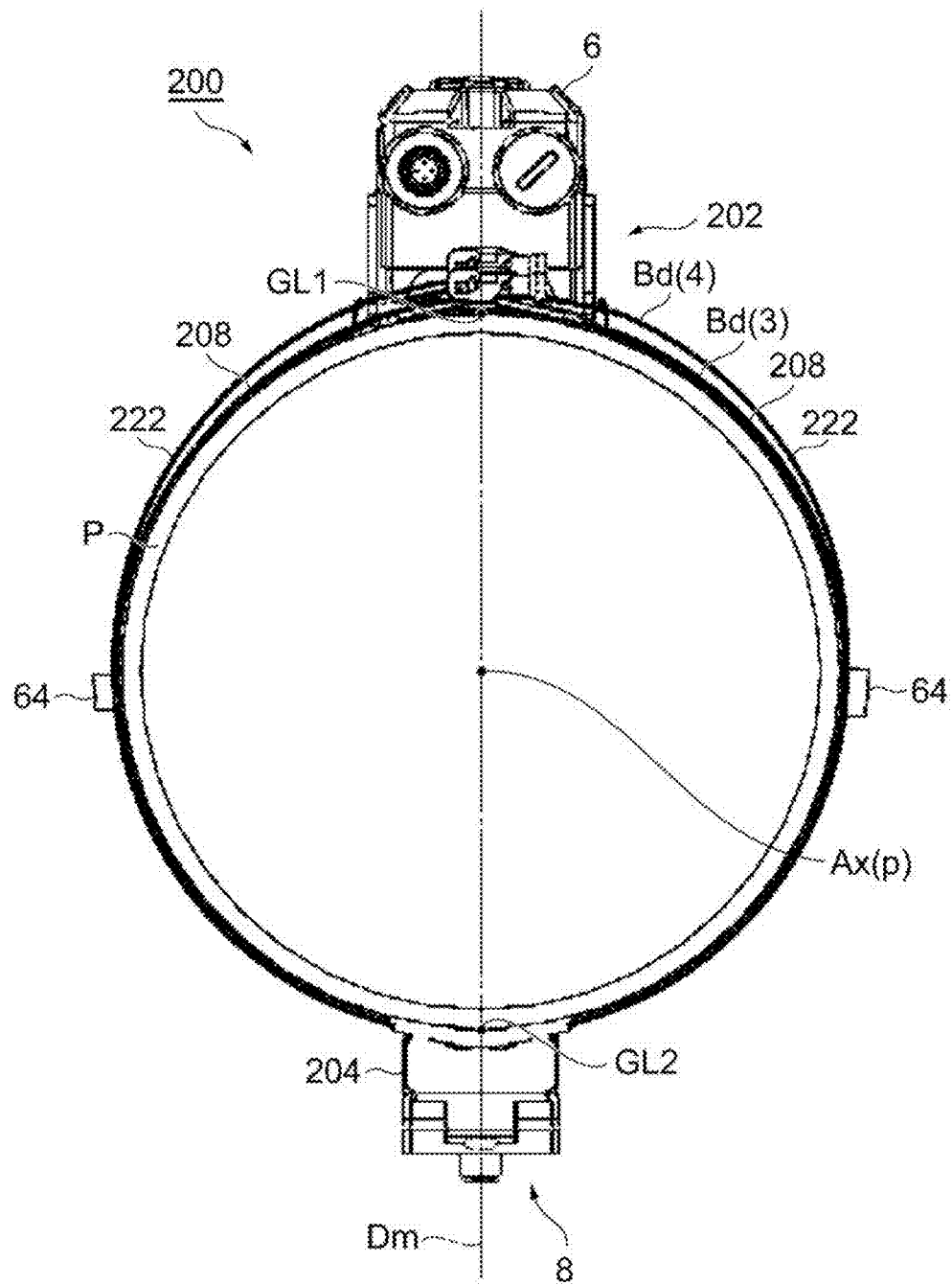
FIG. 12 is an end view of an ultrasonic flow sensor system of a second embodiment assembled on piping.
Figure 13:
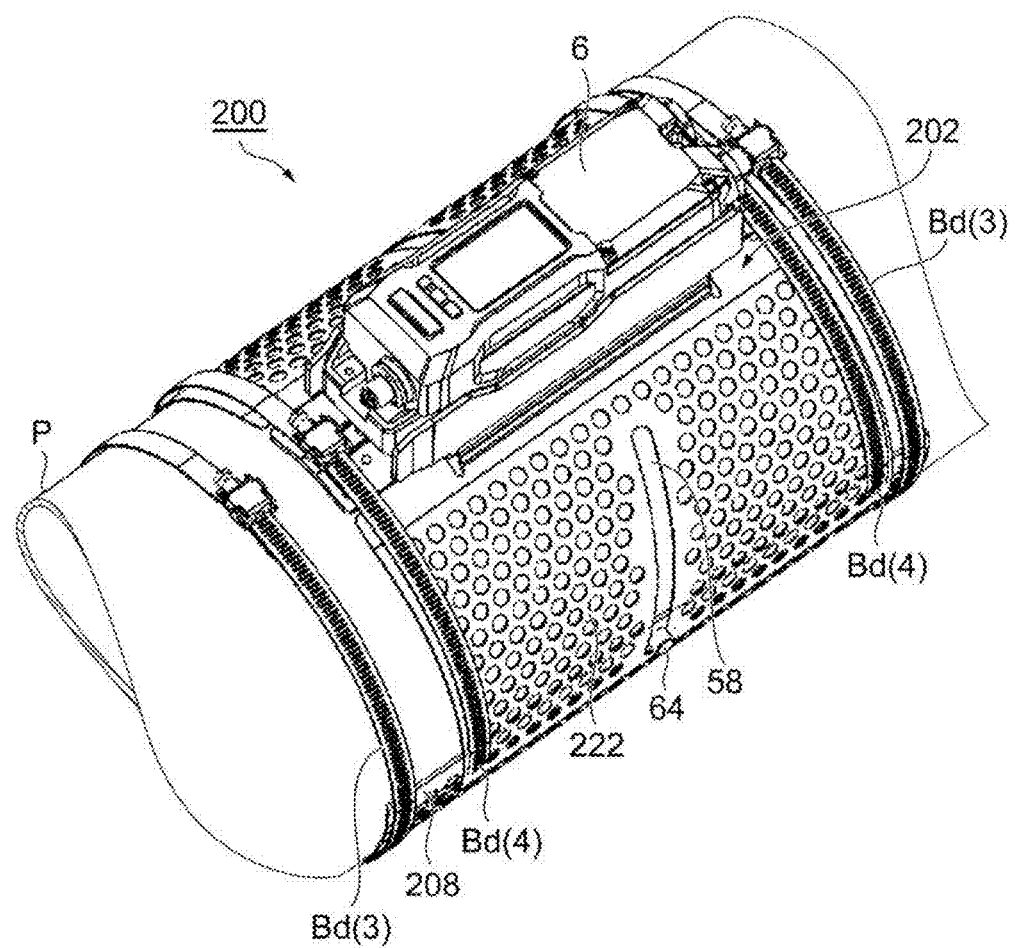
FIG. 13 is a perspective view of the ultrasonic flow sensor system of the second embodiment assembled on the piping.
Figure 14:
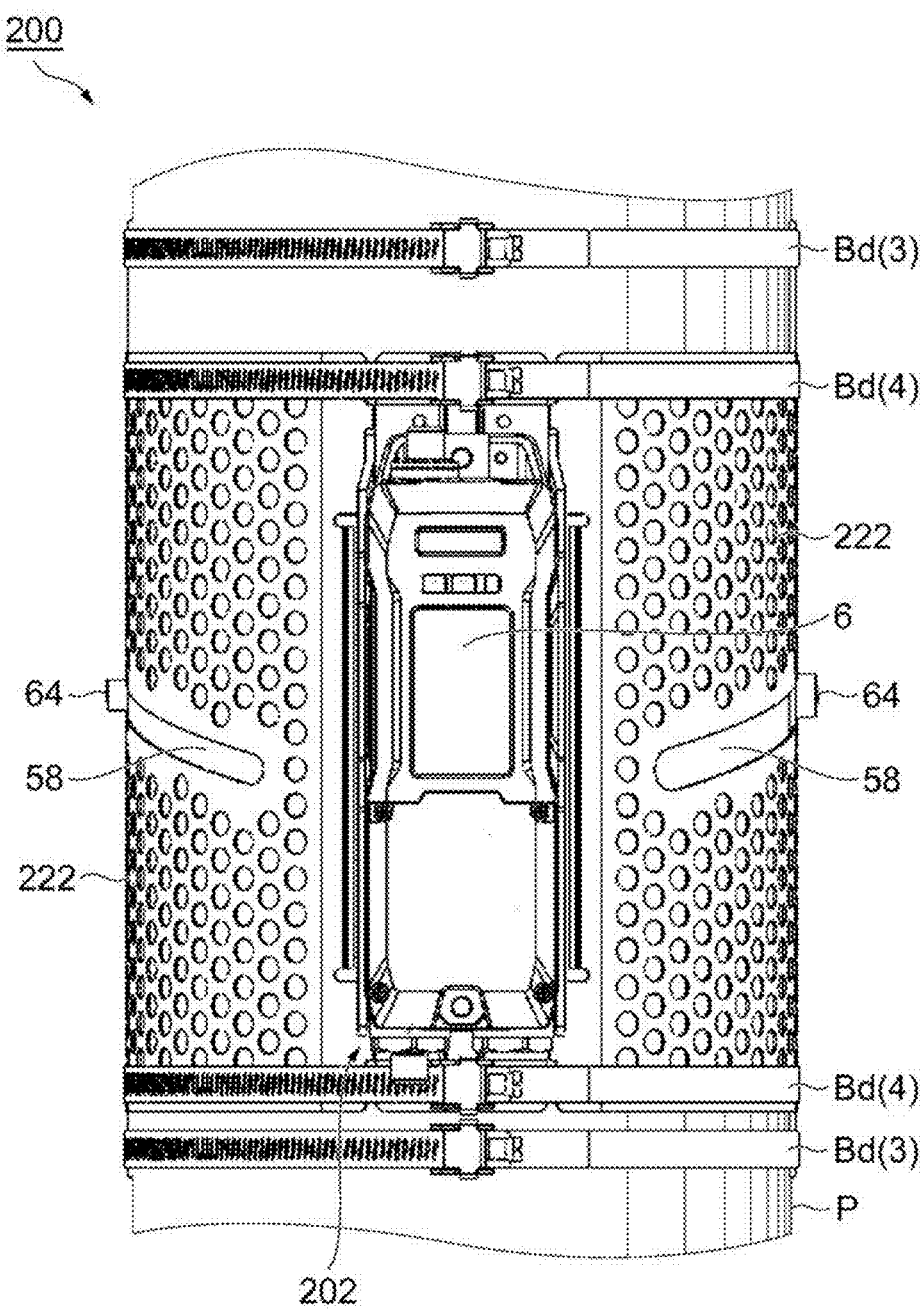
FIG. 14 is a front view of the ultrasonic flow sensor system of the second embodiment assembled on piping in a direction viewing right from the front.
Figure 15:
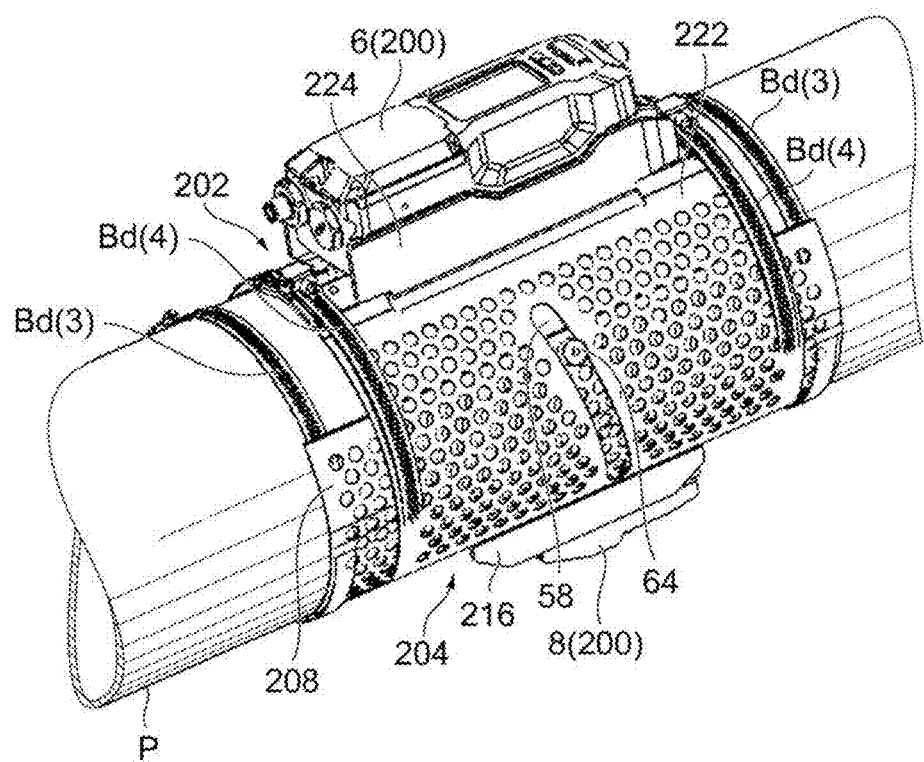
FIG. 15 is a perspective view of the ultrasonic flow sensor system of the second embodiment assembled to the piping.
Figure 16:
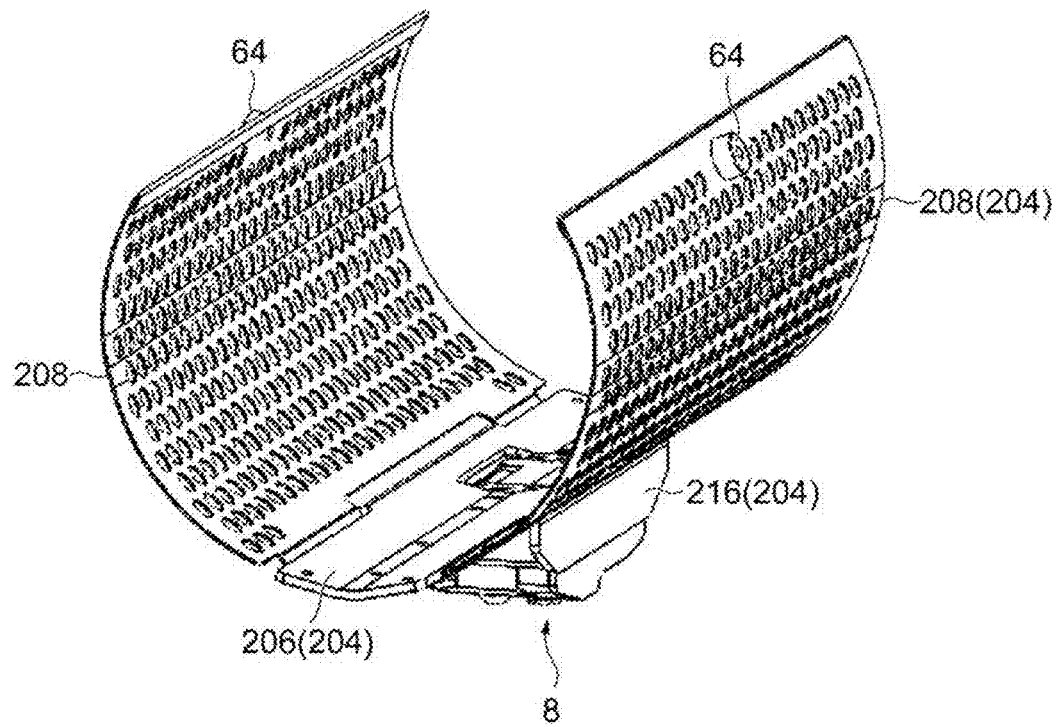
FIG. 16 is a perspective view of a second fitting included in the ultrasonic flow sensor system of the second embodiment.

The first and second sensor units included in an ultrasonic flow sensor system 200 illustrated in FIG. 12 and the like are the same as the first and second sensor units 6 and 8 (FIG. 1 to FIG. 3) included in the above-described first embodiment. Therefore, detailed description will be omitted in the description of the second embodiment by designating the first sensor unit by reference numeral 6 and designating the second sensor unit by reference numeral 8.

The ultrasonic flow sensor system 200 includes first and second fittings 202 and 204, and the first and second sensor units 6 and 8 may be attached to the peripheral surface of the piping P by using the two fittings 202 and 204. The ultrasonic flow sensor system 200 is an attachment system suitable for the Z-shaped arrangement.

The piping P or the fluid flowing in the piping P are not specifically limited for the application of the second embodiment. However, a typical example of application will be listed below.

(1) Diameter of Piping P: 100 mm to 220 mm (Suitable diameter of Piping P: approximately 114 mm to approximately 216 mm)

(2) Material of Piping P: steel, SUS, copper, polyvinyl Chloride (PVC)

(3) Fluid: water, oil, drug solution, antifreeze (ethylene glycol), coolant

Figure 17:
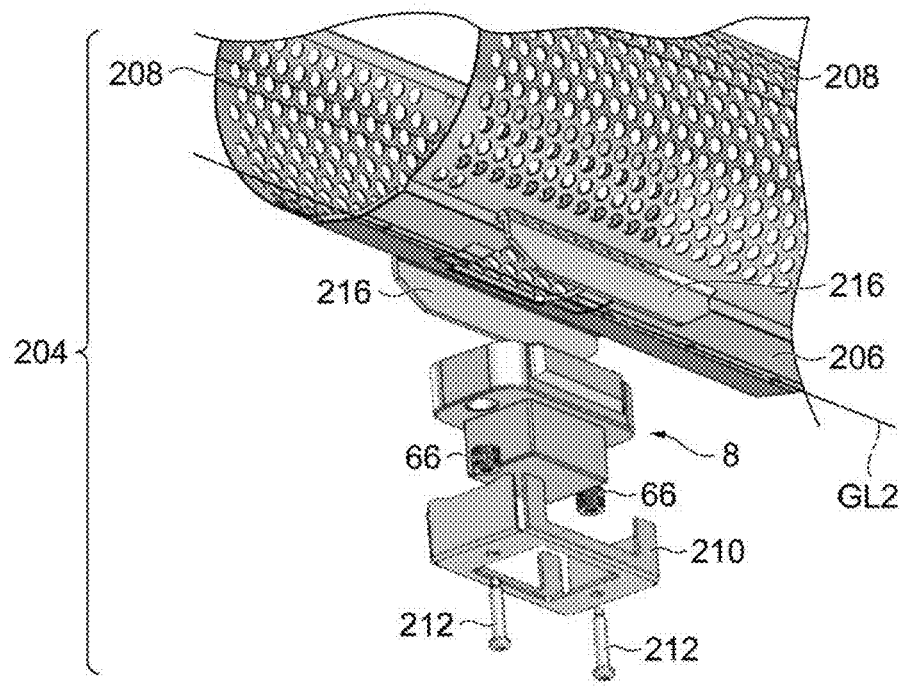
FIG. 17 is an exploded perspective view of the second fitting included in the ultrasonic flow sensor system of the second embodiment.

Referring now to FIG. 16 to FIG. 21, a fitting in which the second sensor unit 8 is installed, that is, the second fitting 204 will be described. Referring now to FIG. 17, the second fitting portion of the second fitting 204 includes a press-molded elongated second position regulating portion 206 and second arm portions 208 coupled to one side edge and the other side edge of the second position regulating portion 206. The second position regulating portion 206 and the second arm portions 208 have a length along the direction of the longitudinal axis Ax(p) of the piping P.

The second arm portions 208 are bendable in the circumferential direction along the cross-sectional circle of the piping P. Specifically, the second arm portions 208 are formed of a bendable plate member, preferably a punched metal. With the second arm portions 208 formed of the punched metal, reduction in weight of the second arm portions 208 is achieved while securing a predetermined rigidity of the second arm portions 208.

Figure 18:
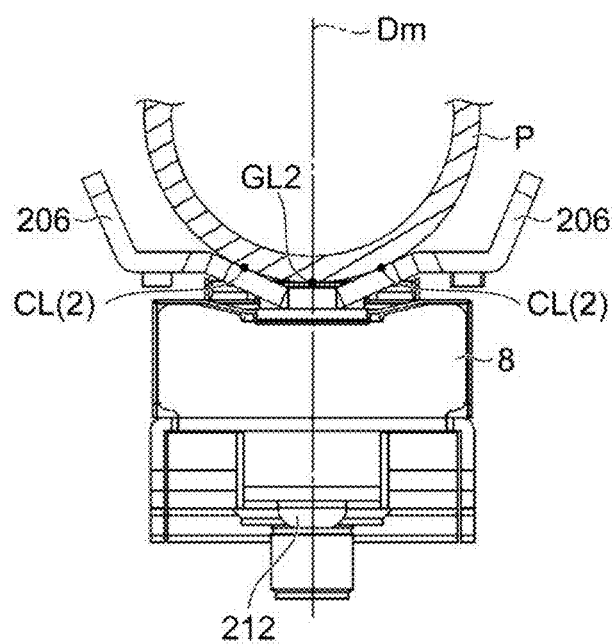
FIG. 18 is an end view of the second fitting included in the ultrasonic flow sensor system of the second embodiment.
Figure 19:
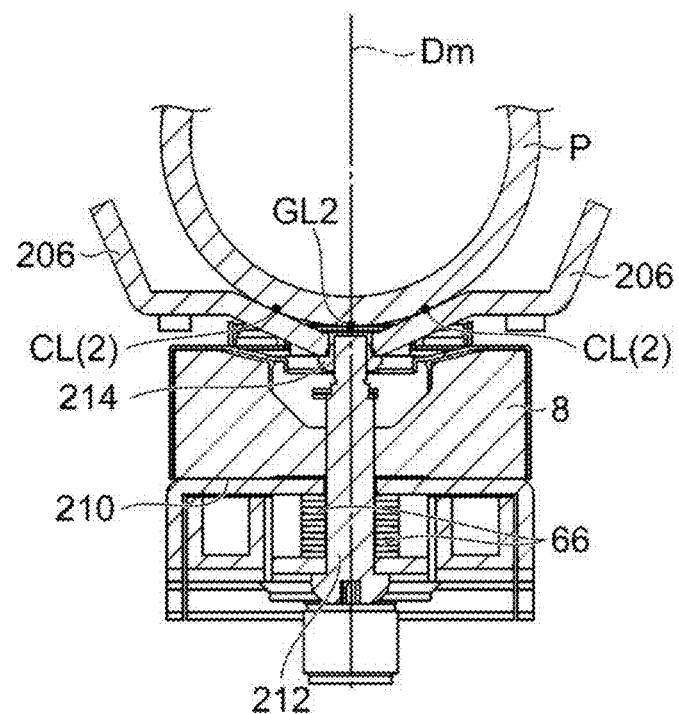
FIG. 19 is a cross-sectional view of the second fitting included in the ultrasonic flow sensor system of the second embodiment.
Figure 21:
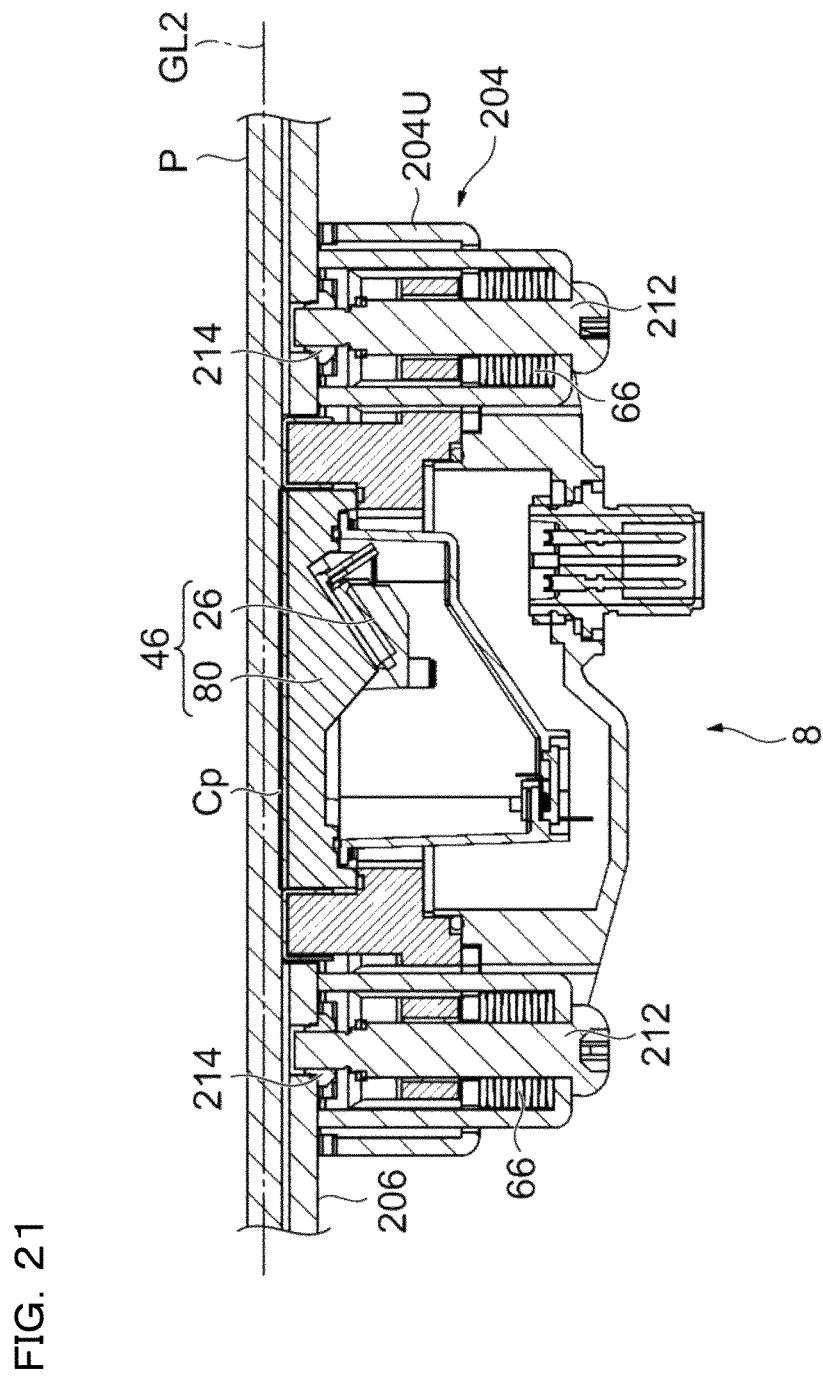
FIG. 21 is an explanatory cross-sectional view illustrating a state in which a second sensor unit included in the ultrasonic flow sensor system of the second embodiment is attached to the piping with the second fitting.

FIG. 18 is an end view of the second position regulating portion 206, and FIG. 19 is a cross-sectional view of the second position regulating portion 206. Referring now to FIG. 16 to FIG. 19, the second position regulating portion 206 includes nuts 214 (FIG. 19) in which bolts 212 passing through a unit housing member 210 (FIG. 17 and FIG. 19) enclosing the second sensor unit 8 are screwed. Two of the bolts 212 are arranged at a distance on the diameter Dm of the piping P, that is, on the second mother line GL2. The unit housing member 210 constitutes a second unit housing portion in cooperation with the second position regulating portion 206 and a pair of vertical walls 216 (FIG. 17) erecting from the second position regulating portion 206. Referring to FIG. 21, the aforesaid plurality of disc springs 66 are coaxially put on the bolts 212, and the second sensor unit 8 is biased by the disc springs 66 in the direction coming into press contact with the piping P.

The second position regulating portion 206 has a symmetrical shape with the second mother line GL2 interposed therebetween as clearly understood from FIG. 18 and FIG. 19, and has a shape having a pair of molded inclined wing portions extending toward one side and the other side with respect to the second mother line GL2 at a predetermined angle. The second position regulating portion 206 is in contact with the piping P at two positions CL(2) on both sides of the second mother line GL2 at equal distance from the second mother line GL2. Accordingly, the second sensor unit 8 may be aligned with the second mother line GL2, and the second sensor unit 8 may be oriented toward the diameter direction Dm passing through the center of the piping P.

Referring to FIG. 17, the second arm portions 208 which constitute part of the second fitting 204, that is, the punched metal arms, are fixed with the aforesaid pins 64 (FIG. 20) at the center portions thereof in the longitudinal direction. As described above, the second position regulating portion 206 has an elongated shape extending on the second mother line GL2. The second arm portions 208 are coupled to one side edge and the other side edge of the second position regulating portion 206, and the pair of second arm portions 208 are provided with the aforesaid pins 64 installed at symmetrical positions with respect to the second mother line GL2. The second arm portions 208 formed of punched metal have flexibility, and are bendable in the circumferential direction of the piping P. Therefore, the second arm portions 208 may be wound along the peripheral surface of the piping P and in a state of being adjacent to the peripheral surface of the piping P.

Figure 20:
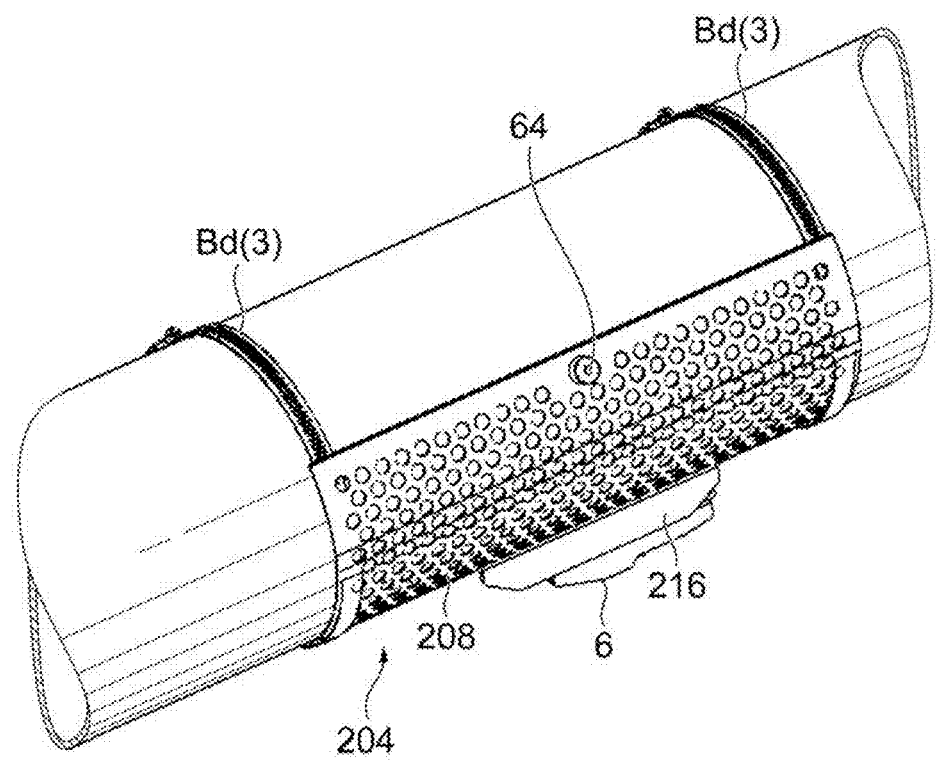
FIG. 20 is a perspective view of the second fitting included in the ultrasonic flow sensor system of the second embodiment attached to the piping.

Metallic bands Bd(3) are attached to one end and the other end of the second arm portions 208 formed of punched metal in the direction of the longitudinal axis Ax(p) of the piping P (FIG. 20). The second fitting 204 may be fixed to the piping P by using these two bands Bd(3).

Figure 22:
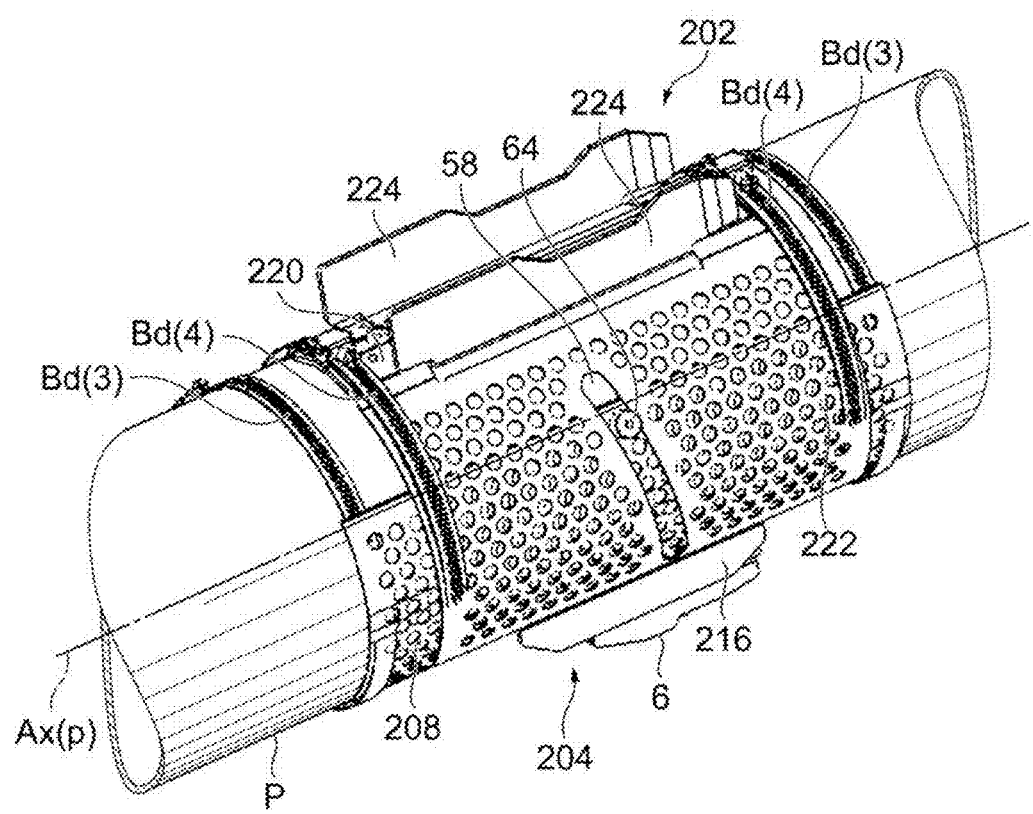
FIG. 22 is an explanatory perspective view illustrating a state in which a first fitting and the second fitting included in the ultrasonic flow sensor system of the second embodiment are attached to the piping.

FIG. 22 is an explanatory drawing illustrating a fitting for installing the first sensor unit 6, that is, the first fitting 202. The configuration of the first fitting 202 is substantially the same as the second fitting 204. A pair of vertical walls 224 of the first fitting 202 correspond to the vertical walls 216 of the aforesaid second fitting 204.

The first fitting 202 includes a first position regulating portion 220 (FIG. 22), and the first position regulating portion 220 corresponds to the second position regulating portion 206 of the second fitting 204. The first fitting 202 includes first arm portions 222, and the first arm portions 222 correspond to the second arm portions 208 formed of the punched metal of the second fitting 204. Metallic bands Bd(4) are attached to one end and the other end of the first arm portions 222 formed of punched metal in the direction of the longitudinal axis Ax (p) of the piping P. The first fitting 202 is fixed to the piping P with two bands Bd(4) in a state in which the first arm portions 222 of the first fitting 202 are overlapped on the second arm portions 208 of the second fitting 204.

The first fitting 202 and the second fitting 204 are different from each other at two points as described below.

(1) The first arm portions 222 of the first fitting 202 are shorter than the second arm portions 208 of the second fitting 204 in the direction in length along the direction of the longitudinal axis Ax(p) of the piping P.

(2) The aforesaid inclined slits 58 are formed on the first arm portions 222 of the first fitting 202, and the pins 64 of the second fitting 204 are arranged in the inclined slits 58.

In this second embodiment as well, the first and second fittings 202 and 204 may provide a function of converting first information to second information by the inclined slits 58 and the pins 64. The first information is information on the diameter of the piping P on which the first and second fittings 202 and 204 are fitted. The second information is information on adequate distance between the first and second fittings 202 and 204 along the direction of the longitudinal axis Ax(p) of the piping P. Therefore, the first and second fittings 202 and 204 are positioned by the inclined slits 58 and the pins 64 at an adequate distance along the direction of the longitudinal axis Ax(p) of the piping P.

The first and second fittings 202 and 204 have a function to position the first sensor unit 6 on the first mother line GL1 (FIG. 12) by a mutual action and on the other hand, position the second sensor unit 8 on the second mother line GL2 (FIG. 12) in the same manner as the ultrasonic flow sensor system 1 in the first embodiment.

The ultrasonic flow sensor system 200 of the second embodiment allows the first and second sensor units 6 and 8 to be installed by using the first and second fittings 202 and 204 in a state in which the operator faces the piping P from one side. The procedure of the operation and contents of the operation are as follows.

(Step 1) Assemble the second sensor unit 8 to the second fitting 204 (FIG. 17).

(Step 2) Provisionally fix the second fitting 204 having the second sensor unit 8 mounted thereon to the piping P in a state in which the operator faces the piping P. This provisional fixation may be performed by using the bands Bd (3) of the second fitting 204. In the state of being provisionally fixed, the second sensor unit 8 is in the state of being biased toward the peripheral surface of the piping P by the disc springs 66 of the second fitting 204.

(Step 3) Rotate the second fitting 204 in the circumferential direction of the piping P to position the second fitting 204 on the opposite side of the piping P when viewed from the operator.

(Step 4) Assemble the first sensor unit 6 to the first fitting 202 in the same manner as the case of the second fitting 204 although FIG. 17 illustrates the second fitting 204.

(Step 5) Provisionally fix the first fitting 202 having the first sensor unit 6 mounted thereon to the piping P in a state in which the operator faces the piping P. This provisional fixation may be performed by using the bands Bd(4) of the first fitting 202 (FIG. 22). In the state of being provisionally fixed, the first sensor unit 6 is in the state of being biased toward the peripheral surface of the piping P by the disc springs 66 of the first fitting 202. The provisional fixation of the first fitting 202 to the piping P brings the first sensor unit 6 to be provisionally positioned on the first mother line GL1, and the second sensor unit 8 to be provisionally positioned on the second mother line GL2 by the cooperation of the inclined slits 58 of the first fitting 202 and the pins 64 of the second fitting 204.

(Step 6) Fix the second fitting 204 to the piping P. Fix the first fitting 202 to the piping P. Accordingly, the first sensor unit 6 is positioned on the first mother line GL1. The second sensor unit 8 is positioned on the second mother line GL2. The first and second sensor units 6 and 8 are placed apart from each other along the direction of the longitudinal axis Ax(p) of the piping P, and the distance is properly adjusted. The first sensor unit 6 is brought into a state being biased toward the peripheral surface of the piping P by the disc springs 66 of the first fitting 202. In the same manner, the second sensor unit 8 is brought into a state being biased toward the peripheral surface of the piping P by the disc springs 66 of the second fitting 204.

As is understood immediately from the description above, the first and second sensor units 6 and 8 may be adequately placed on the piping P in the Z-shaped arrangement while continuing the state in which the operator faces the piping P. In other words, the operator does not have to move around the piping P for assembling the first and second sensor units 6 and 8 adequately to the first and second mother lines GL1 and GL2 facing the diameter direction of the piping P. Therefore, even in the working environment such that a plurality of the piping P are arrayed side by side, the first and second sensor units 6 and 8 may be installed easily.

Although the preferred first embodiment and second embodiment of the invention have been described thus far, the invention is not limited to the first embodiment and the second embodiment described above, and the following modifications are included.

Figure 23:
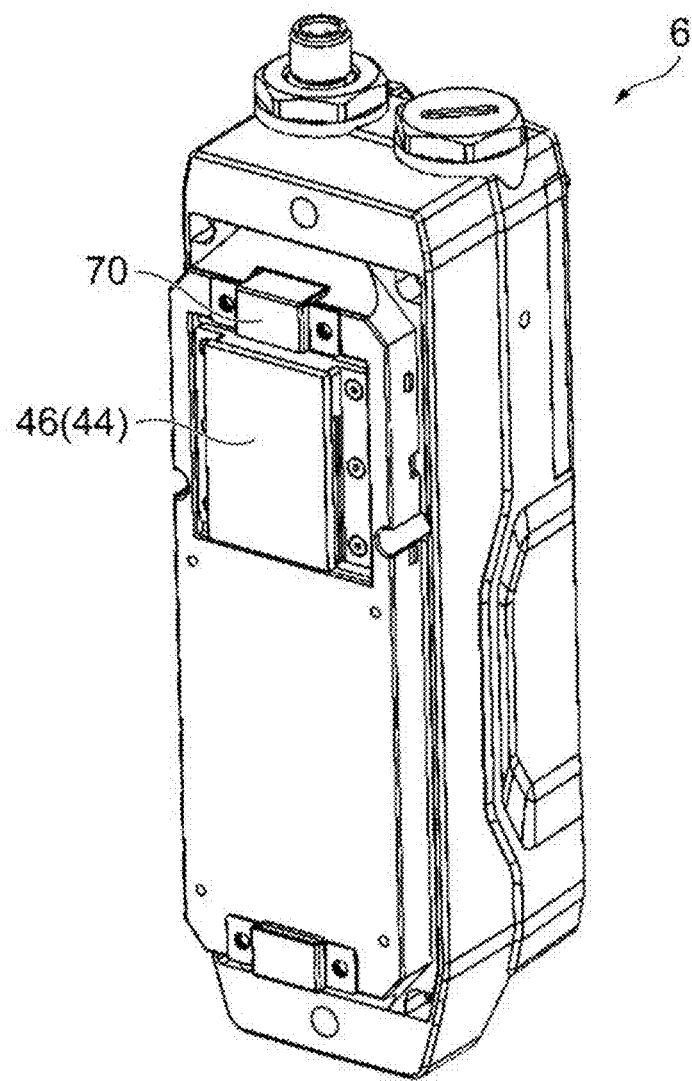
FIG. 23 is a perspective view of a first sensor unit having a temperature sensor assembled thereto viewed from a bottom surface side.
Figure 24:
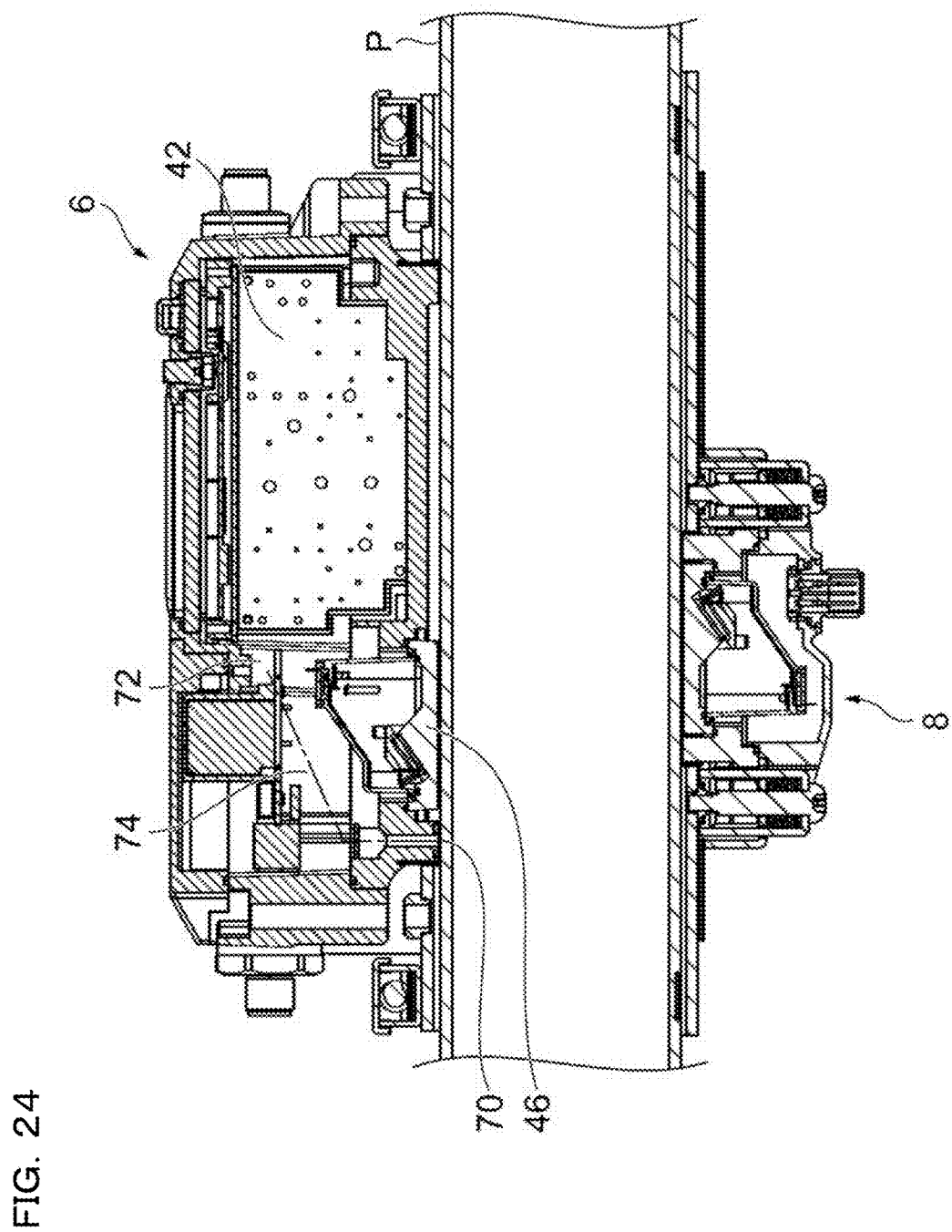
FIG. 24 is an explanatory cross-sectional view illustrating a state in which the ultrasonic flow sensor having the temperature sensor assembled thereto is attached to the piping.

(1) The ultrasonic flow sensor included in the invention may include a heat detection surface 70 as illustrated in FIG. 23 and FIG. 24 on a surface coming into contact with the piping P. Although FIG. 23 and FIG. 24 disclose an example in which the heat detection surface 70 is provided on the first sensor unit 6, the heat detection surface 70 may be provided on the second sensor unit 8 instead of the first sensor unit 6. The heat detection surface 70 is disposed adjacent to the first wedge member 46 of the first sensor portion 44 (FIG. 24), and the heat detection surface 70 is brought into press contact with the piping P, so that the temperature of the piping P is detected. A portion around a heat transfer member 74 between the heat detection surface 70 and a thermister 72 is resin-potted. Accordingly, dust proof and water proof properties of the first sensor unit 6 are achieved. The heat detection surface 70 preferably has a limited surface area, and a portion around the heat detection surface 70 is preferably formed of a heat insulating material. Accordingly, transfer of periphery heat to the heat detection surface 70 may be prevented while reducing the thermal capacity of the heat detection surface 70. In the first sensor unit 6 provided with the heat detection surface 70, the heat detection surface 70 is configured as a SUS material.

The heat detection surface 70 projects in the direction of coming into press contact with the piping P compared with the first sensor portion 44 (first wedge member 46) positioned adjacent to the heat detection surface 70. An amount of projection is set so that a rubber sheet (elastic solid couplant Cp) interposed between the first sensor portion 44 and the piping P is in an adequately compressed state, In other words, the heat detection surface 70 formed of the SUS material limits an amount of collapse of the elastic solid couplant Cp between the first sensor portion 44 and the piping P, which ensures the couplant Cp to adequately function as an acoustic coupling medium.

Figure 25:
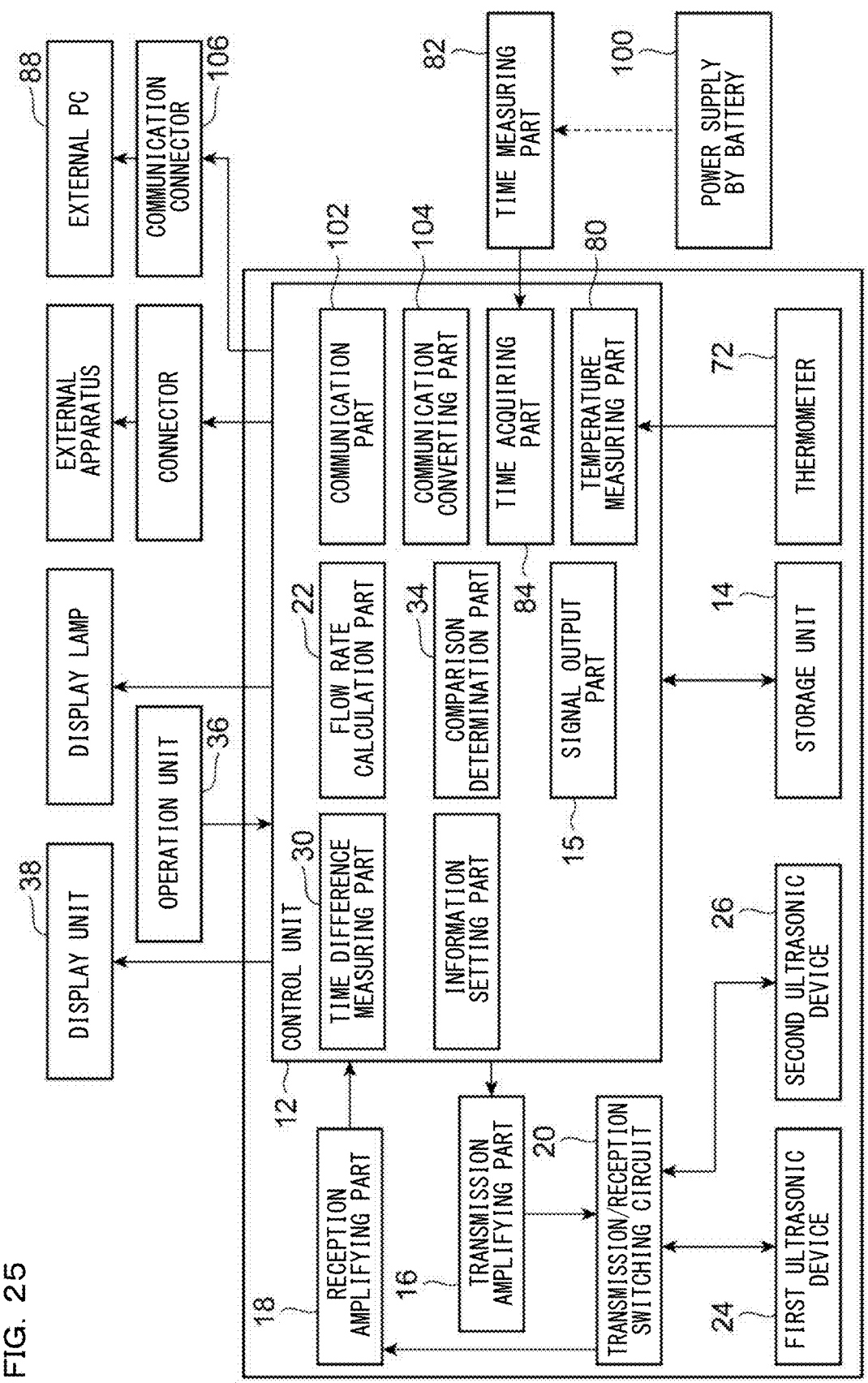
FIG. 25 is a functional block diagram of the ultrasonic flow sensor having the temperature sensor illustrated in FIG. 23 and FIG. 24 assembled thereto.

FIG. 25 illustrates a block diagram of a ultrasonic flow sensor including a circuit configured to detect the temperature of the piping P. A temperature signal of the piping P detected by the thermister 72 is converted into temperature data by a temperature measuring part 80. The temperature data is associated with time data acquired from a time measuring part 82, and is associated with the flow rate flowing in the piping P at the corresponding time. These data is stored in the storage unit 14. The time is preferably an absolute time, and thus power source is supplied to the time measuring part 82 from a battery 100 provided separately. Accordingly, even though the main power source is turned OFF, the time is continuously measured.

The flow rate data on the fluid in the piping P and the temperature data of the fluid with the intermediary of the piping P may be read out by an external PC 88 via a communication part 102. The data is converted into data of, for example, RS232C by a communication converting part 104, and is output to the external PC 88 via a communication connector 106.

Figure 26:
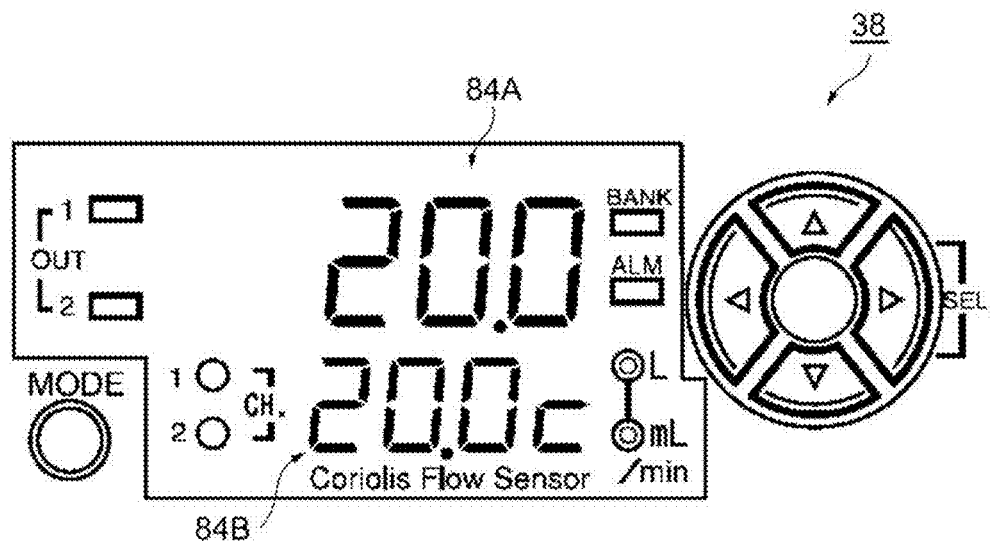
FIG. 26 is an explanatory drawing illustrating an example in which detected temperature and flow rate of the piping are displayed adjacent to each other in a display unit of the ultrasonic flow sensor having the temperature sensor assembled thereto.

FIG. 26 is an explanatory drawing illustrating an example of display on the display unit 38 of the first sensor unit 6. The display unit 38 has two upper and lower display fields, and in the illustrated example, a numerical value 84A (switchable between unit of litter (L) or milliliter (mL)) indicating "20.0", which is the flow rate, is shown on an upper part, and a numerical value 84B (unit of degree of centigrade) indicating "20.0" which is a temperature of the piping P, is shown on a lower part.

As display on the display unit 38, the illustrative combinations may be listed as follows.

(a) "flow rate" and "temperature"
(b) "temperature" and "calorific value (calories)"
(c) "flow rate" and "calorific value (calories)"

The aforesaid calorific value (calories) may be obtained from the fluid temperature, that is, the piping temperature and the flow rate. The aforesaid (a) to (c) are preferably selectable and/or switchable by the user.

As described above, by adding a temperature detecting function to the first sensor unit 6, that is, to the ultrasonic flow sensor 10, the ultrasonic flow sensor has two functions, namely, a first function as a flow sensor and a second function as a thermometer. Therefore, as described above, detection results detected by these first and second functions may be output. In other words, whether or not the coolant flows through the piping P and, if yes, whether a sufficient amount of coolant flows or not may be displayed or may be output to the outside by OK or NG based on the comparison with a predetermined threshold value.

(2) In the first embodiment, the first and second fittings 2 and 4 are both formed of molds and the arm portions 62 and 56 are formed of molded plate members. In contrast, in the second embodiment, the arm portions 222 and 208 of the first and second fittings 202 and 204 are formed of plate members bendable in the circumferential direction of the piping P. For example, a configuration in which the first arm portions 62 of the first fitting 2 of the first embodiment are formed of a bendable plate member, and a combination of the first fitting of a modification and the second fitting 4 of the first embodiment may be employed as a modification of the invention is applicable. In other words, a configuration in which the arm portion of one of the two fittings is formed of a member bendable in the circumferential direction of the piping P, and the arm portion of the other fitting is formed of a mold is also applicable.

Figure 27:
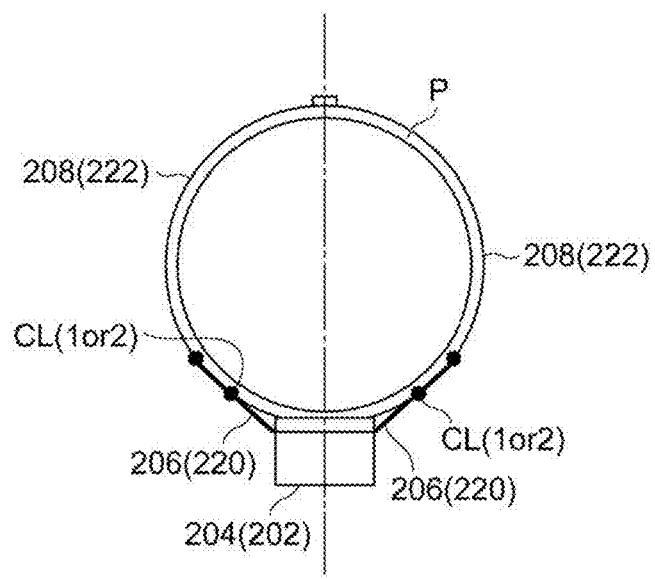
FIG. 27 is an explanatory schematic drawing illustrating a structure of the fitting employed in the second embodiment.
Figure 28:
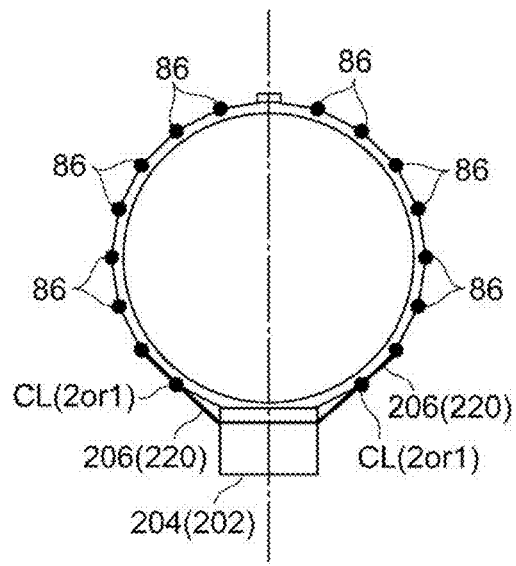
FIG. 28 is an explanatory schematic drawing illustrating a modification of the structure of the fitting employed in the second embodiment.

(3) In the second embodiment, as schematically illustrated in FIG. 27, the arm portions 222 and 208 of the first and second fittings 202 and 204 are formed of plate members bendable in the circumferential direction of the piping P. As a modification, a band member having a multiple joint structure having a plurality of joints 86 in the circumferential direction of the piping P as illustrated in FIG. 28 is also applicable. Known examples of the band having the multiple joint structure include various configuration which includes wrist watch bands.

Figure 29A:
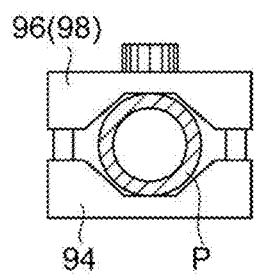
FIG. 29A is an explanatory end view illustrating a modification of an information conversion mechanism described with reference to the first embodiment in a state in which the first and second fittings are fixed to a piping having a relatively small diameter.
Figure 29B:
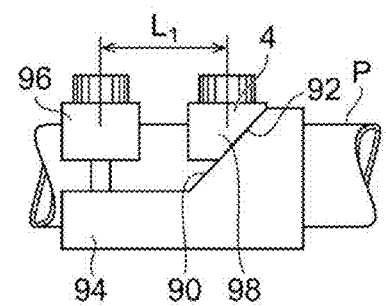
FIG. 29B is an explanatory side view of the information conversion mechanism in FIG. 29A.
Figure 30A:
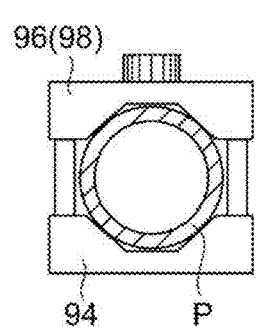
FIG. 30A is an explanatory end view illustrating the modification of the information conversion mechanism described with reference to the first embodiment in a state in which the first and second fittings are fixed to piping having a relatively large diameter.
Figure 30B:
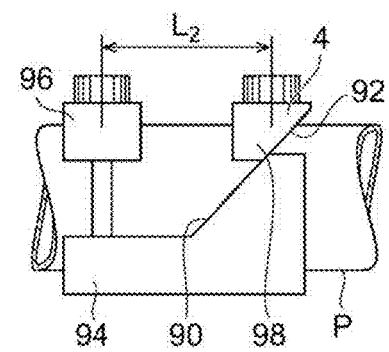
FIG. 30B is an explanatory side view of the information conversion mechanism in FIG. 30A.

(4) In the first embodiment and the second embodiment, a combination of the pins 64 and the inclined slits 58, that is, a method of guiding the pins 64 by the inclined slits 58 is illustrated as the guide portion (information conversion mechanism). Alternatively, the guide portion (information conversion mechanism) including first and second inclined surfaces 90 and 92 as illustrated in FIG. 29B and FIG. 30B. FIG. 29A to FIG. 30B disclose a guide portion (information conversion mechanism) in the V-shaped arrangement. A base member 94 is provided with the first inclined surface 90 and a second fitting 98 is provided with the second inclined surface 92, and the second inclined surface 92 is slid on the first inclined surface 90 to position the second fitting 98 with respect to a first fitting 96 fixedly positioned with respect to the base member 94. FIGS. 29A and 29B illustrate an example of application to piping P having a relatively small diameter, and FIGS. 30A and 30B illustrate an example of application to piping P having a relatively large diameter. It is understood that with the guide portion (information conversion mechanism) based on the interaction between the two inclined surfaces 90 and 92, a distance L1 (FIG. 29) between the first and second fittings 96 and 98 when the piping P has a small diameter is shorter than a distance L2 (FIG. 30) of the first and second fittings 96 and 98 when the piping P has a large diameter.

The two inclined surfaces 90 and 92 illustrated in FIG. 29A to FIG. 30B actually have two functions. The first function is to guide the relative position between the first fitting 96 and the second fitting 98 in the axial direction of the piping P. The second function is to restrict the relative position between the first fitting 96 and the second fitting 98 in the circumferential direction of the piping P.

The first fitting 96, the second fitting 98, and the base member 94 constitute a fitting unit for the V-shaped arrangement. Referring now to FIG. 29A to FIG. 30B, the base member 94 is integrally provided with the first fitting 96, and is configured to move integrally in the circumferential direction of the piping P. In other words, the base member 94 is a member which constitutes part of the first fitting 96. The base member 94 functions as a substantial "pair of arm portions" extending from the first housing portion in the first fitting 96 to the second housing portion in the second fitting 98. The inclined surface 90 formed on the "pair of arm portions" and the inclined surface 92 formed on the second housing portion in the second fitting 98 realize the first function described above, that is, a function to guide the relative position between the first fitting 96 and the second fitting 98 in the axial direction of the piping P. The first and second inclined surfaces 90 and 92 also realize the second function, that is, the function to restrict the relative position between the first fitting 96 and the second fitting 98 in the circumferential direction of the piping P.

(5) In the first embodiment and the second embodiment, a combination of the pins 64 and the inclined slits 58, that is, a method of guiding the pins 64 by the inclined slits 58 are illustrated as the information conversion mechanism. As a modification, a slidable recession/projection fitting between an inclined recessed groove and an inclined projection ridge to be received in the inclined recessed groove may be employed instead of the pins 64 and the inclined slits 58.

Figure 31:
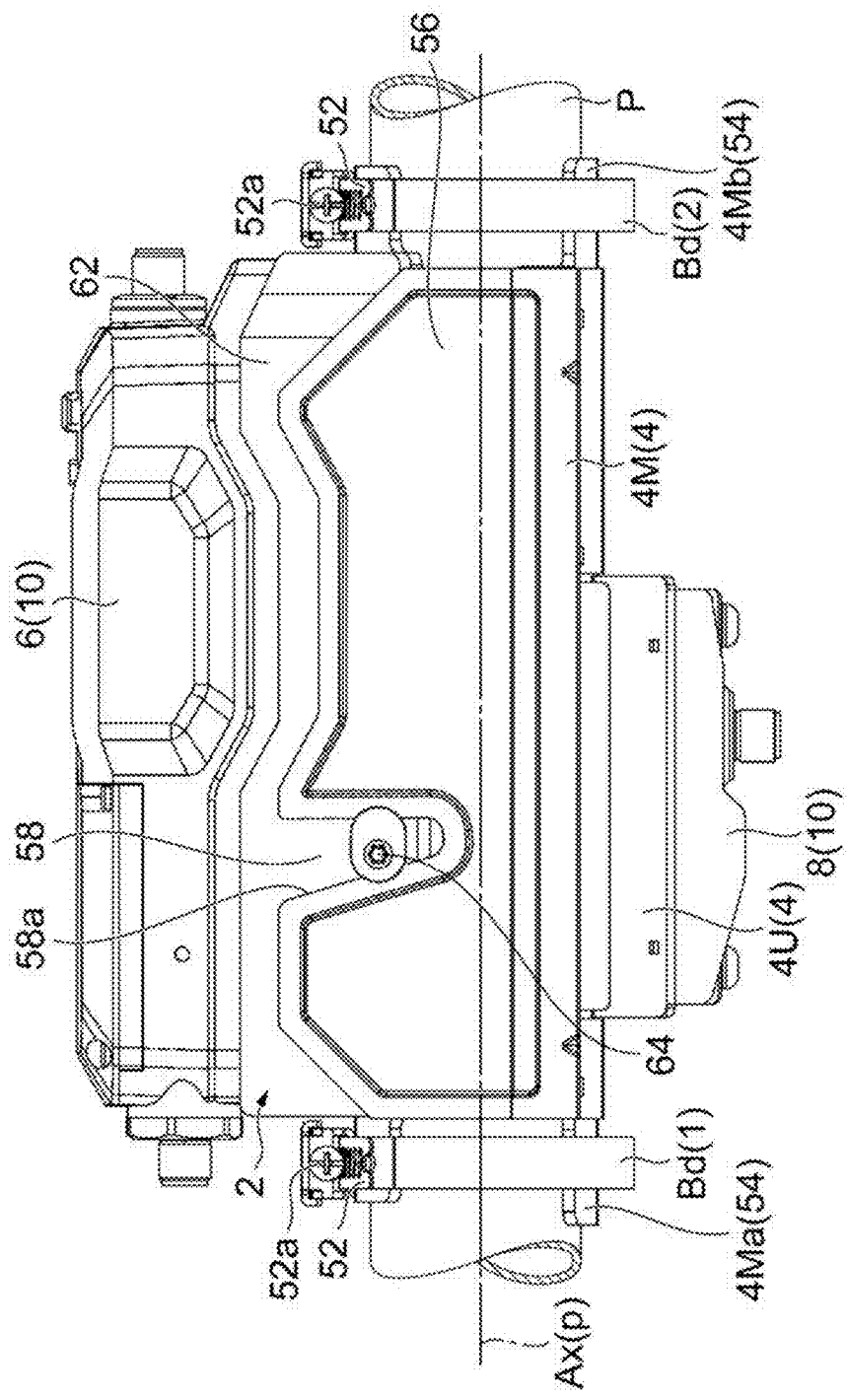
FIG. 31 is an explanatory drawing illustrating a modification relating to a shape of inclined slits included in the information conversion mechanism described with reference to the first embodiment, which corresponds to FIG. 2.

(6) Referring to FIG. 31, the width of the inclined slits 58 may be varied in the longitudinal direction. In this case, one of the inclined edges 58a of the inclined slits 58 constitute part of the information conversion mechanism described above. The one of the edges 58a is referred to as a "guide edge". Referring now to FIG. 31, attachment of the first and second fittings 2 and 4 to the piping P will be described. After provisional fixation of the first and second fittings 2 and 4 to the piping P, the first and second fittings 2 and 4 are relatively displaced in the longitudinal direction of the piping P, and the pins 64 are brought into abutment with the guide edges 58a of the inclined slits 58. Accordingly, the distance (distance in the direction of the longitudinal axis Ax(p) of the piping P) between the first fitting 2 (first sensor unit 6) and the second fitting 4 (second sensor unit 8) may be properly adjusted. The distance between the first fitting 2 (first sensor unit 6) and the second fitting 4 (second sensor unit 8) may be finely adjusted as needed depending on the difference between the wall thickness of the piping P and the type of the fluid flowing in the piping P. The fine adjustment may be achieved by a degree of movement of the pins 64 toward the guide edges 58a of the inclined slits 58.

(7) The modification (6) described above which properly adjusting the distance (the distance in the direction of the longitudinal axis Ax(p) of the piping P) between the first fitting 2 (first sensor unit 6) and the second fitting 4 (second sensor unit 8) by one of the edges 58a of the inclined slits 58 may be applied to the second embodiment in the same manner as the first embodiment.

(8) The above-described modification (6) (FIG. 31) has a configuration in which the pins 64 are brought into abutment with the guide edges 58a of the inclined slits 58. In contrast, portions corresponding to the guide edges 58a may be provided at end portions of the second arm portions 56. The modification will be described in detail with reference to FIG. 32 to FIG. 34 as a first modification.

Figure 33:
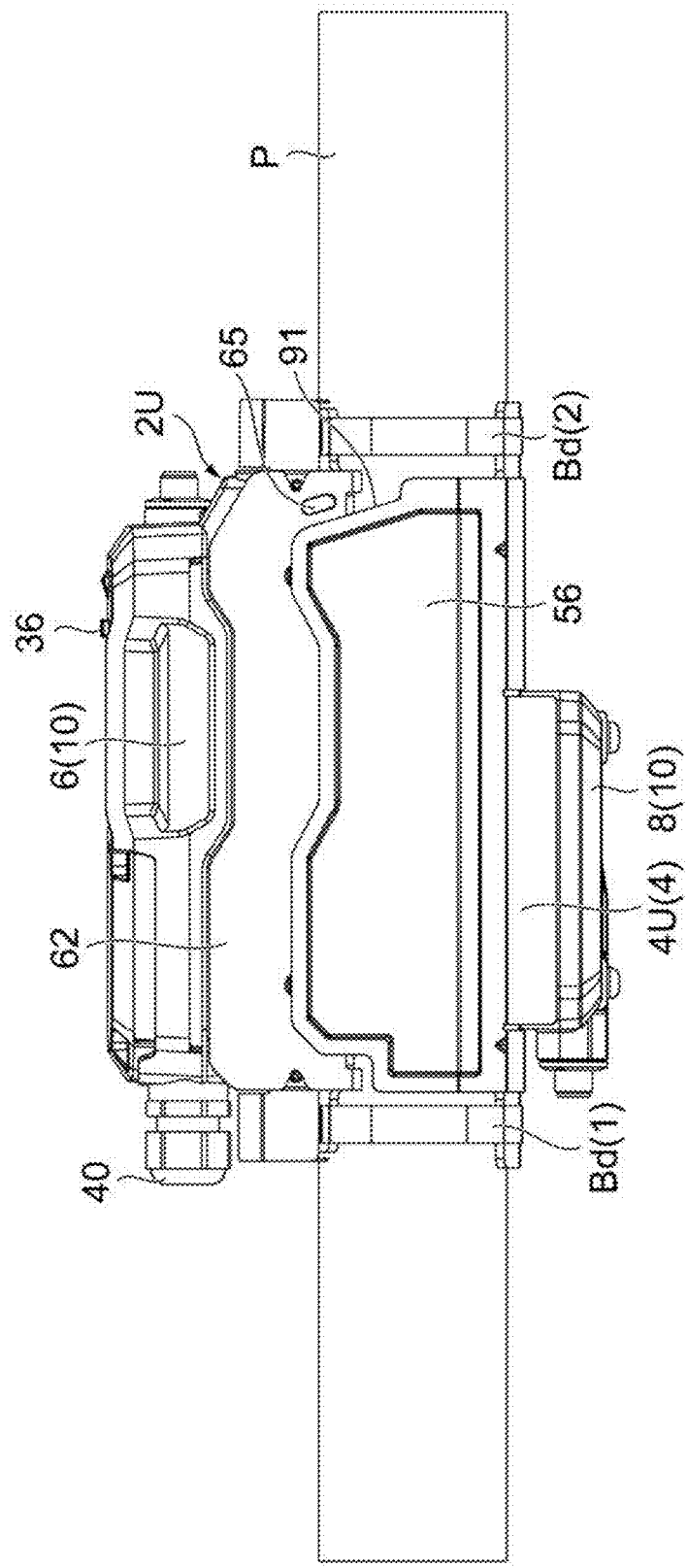
FIG. 33 is a side view of the ultrasonic flow sensor according to the first modification in FIG. 32 illustrating a state before positioning in an axial direction of piping.
Figure 34:
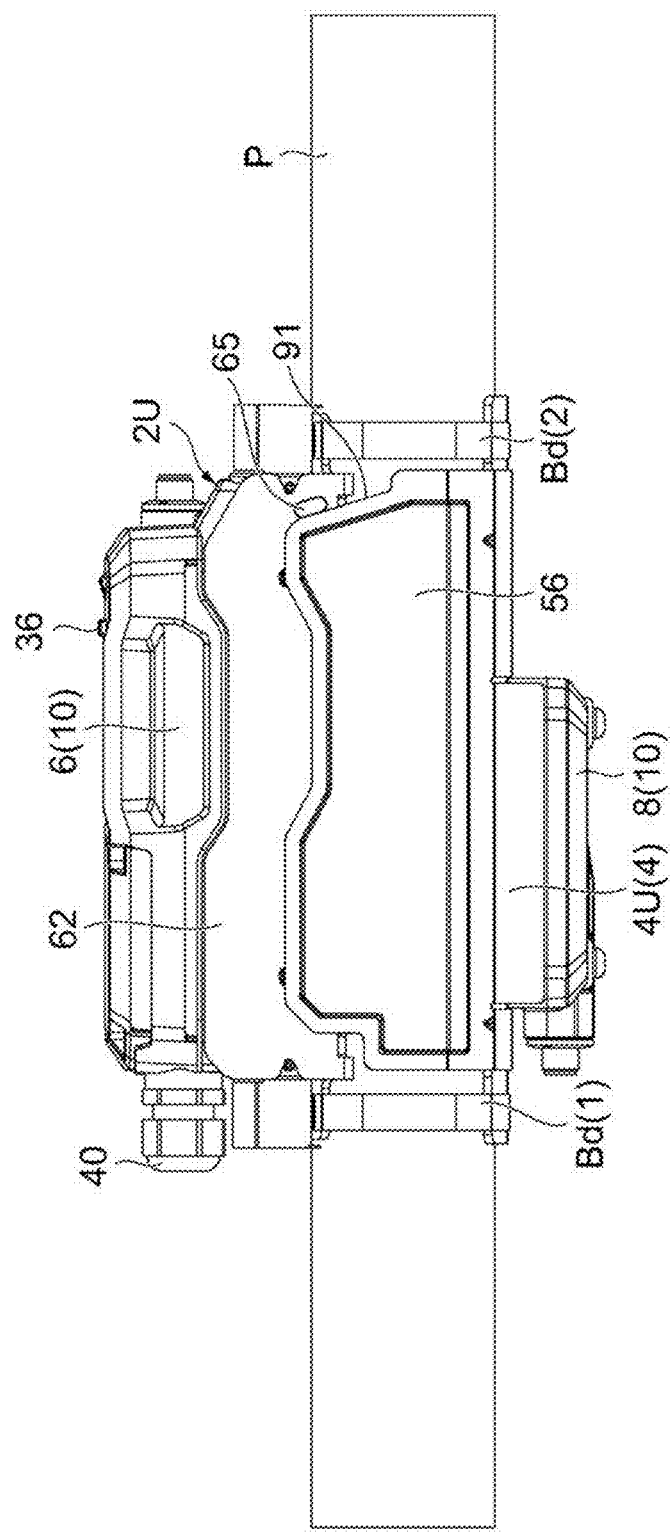
FIG. 34 is a side view of the ultrasonic flow sensor according to the first modification in FIG. 32 illustrating a state after positioning in the axial direction of the piping.

FIG. 32 to FIG. 34 are perspective views of an ultrasonic flow sensor according to the first modification. A basic configuration of the ultrasonic flow sensor is the same as the first embodiment and the modification described above. In other words, the first sensor unit 6 including the operation unit 36, the display unit 38, the output unit 40 and the like is accommodated in the first unit housing portion 2U. The first unit housing portion 2U includes the first position regulating portion 60 attached thereto, and the first arm portions 62 extending from the vicinity of distal end portions of the first position regulating portion 60. In contrast, the second sensor unit 8 is accommodated in the second unit housing portion 4U. The second unit housing portion 4U includes the second position regulating portion 54 attached thereto, and the second arm portions 56 extending from the vicinity of distal end portions of the second position regulating portion 54. The first arm portions 62 and the second arm portions 56 extend upward and downward respectively as clearly understood from FIG. 32. The first sensor unit 6 and the second sensor unit 8 are fixed to the piping P by using the first and second bands Bd(1) and Bd(2).

As illustrated in FIG. 32 to FIG. 34, a longitudinal end portions of the first arm portions 62 are provided with pins 65 projecting outward. In contrast, the second arm portions 56 is provided with inclined walls 91 at end edges of the second arm portions 56 so as to incline with respect to the axial direction of the piping P and coming into contact with the pins 65 at predetermined positions depending on the diameter of the piping P. The pins 65 and the inclined walls 91 constitute a guide portion configured to guide relative positioning between the first sensor unit 6 and the second sensor unit 8 in the axial direction of the piping P.

More specifically, the first sensor unit 6 (the first fitting which holds the first sensor unit 6) is pressed against the piping P via the first position regulating portion 60, and the second sensor unit 8 (the second fitting which holds the second sensor unit 8) is pressed against the piping P via the second position regulating portion 54. In a state of simply pressed, the pins 65 and the inclined walls 91 are apart from each other by a predetermined distance as illustrated in FIG. 33. Then, as illustrated in FIG. 34, either one or both of the first sensor unit 6 (the first fitting which holds the first sensor unit 6) or the second sensor unit 8 (the second fitting which holds the second sensor unit 8) is moved along the axial direction of the piping P to bring the pins 65 into contact with the inclined walls 91. At this time, since the angle of inclination of the inclined walls 91 is determined adequately in advance considering the diameter of the piping P, the relative position between the first sensor unit 6 and the second sensor unit 8 in the axial direction of the piping P is optimized by tightening the first and second bands Bd(1) and Bd(2) in a state in which the pins 65 are in contact with the inclined walls 91. Therefore, as the user is guided by the pins 65 and the inclined walls 91 to an adequate relative position between the first sensor unit 6 and the second sensor unit 8 along the axial direction of the piping P, easy attachment of these units to the piping P is achieved.

Figure 36:
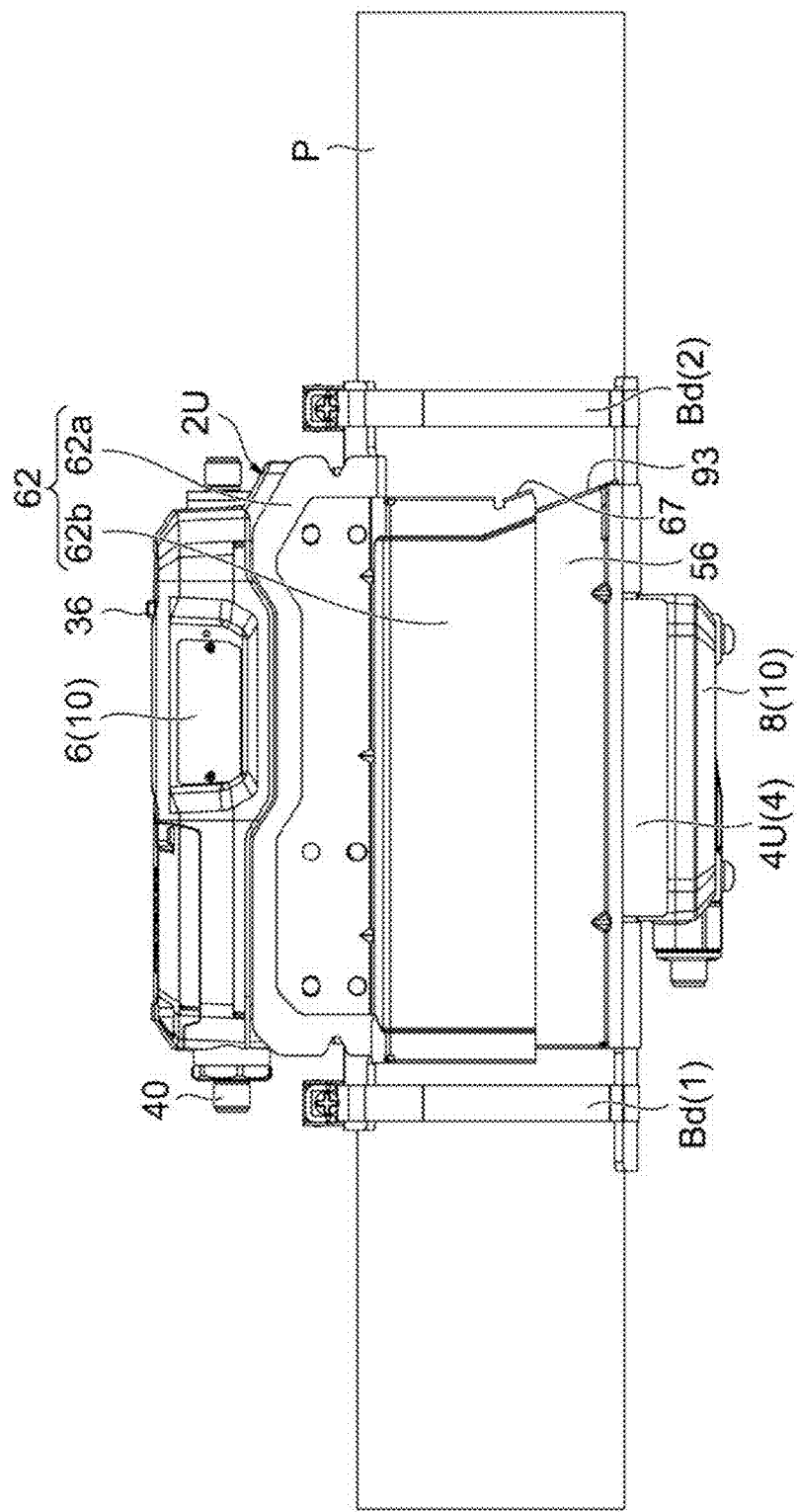
FIG. 36 is a side view of the ultrasonic flow sensor according to the second modification in FIG. 35 illustrating a state before positioning in the axial direction of the piping.
Figure 37:
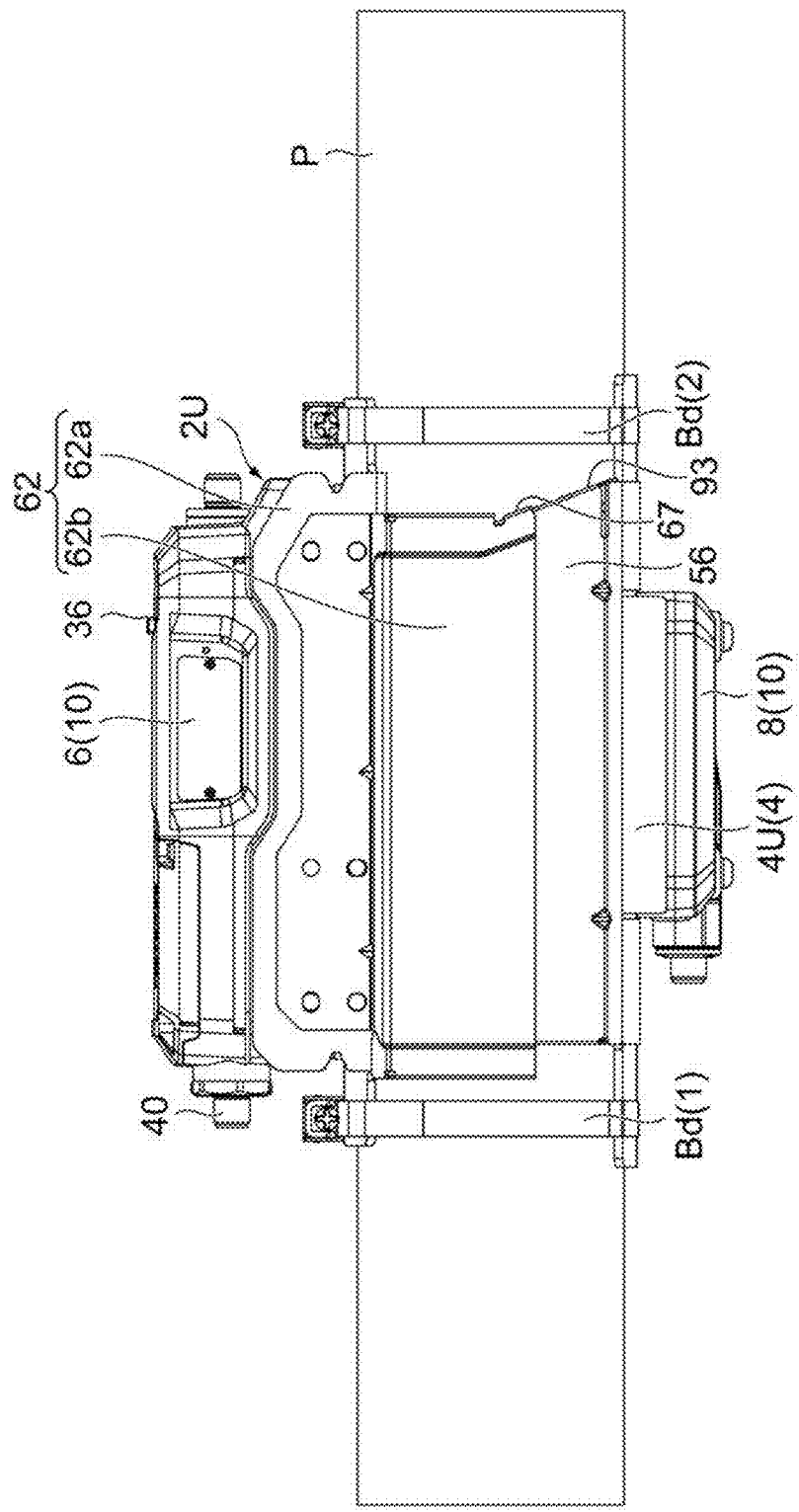
FIG. 37 is a side view of the ultrasonic flow sensor according to the second modification in FIG. 35 illustrating a state after positioning in the axial direction of the piping.

(9) In the first modification (8) described above, the pins 64 projecting outward are provided on the first arm portions 62. However, the invention is not limited thereto, and, for example, hook-shaped contact portions may be provided as a guide portion at ends of the first arm portions 62. A second modification will be described with reference to FIG. 35 to FIG. 37.

Figure 35:
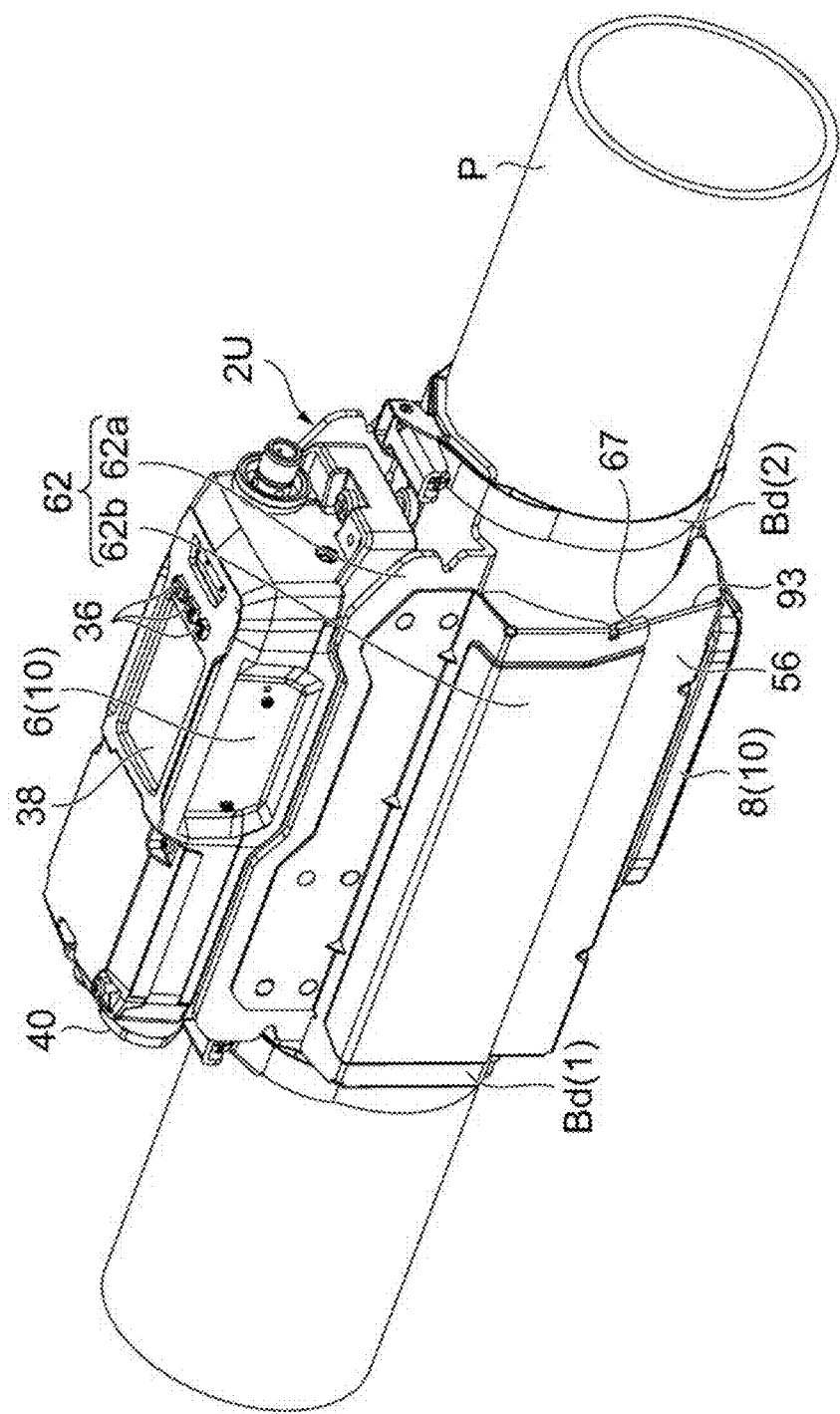
FIG. 35 is a perspective view of an ultrasonic flow sensor according to a second modification.

FIG. 35 is a perspective view of an ultrasonic flow sensor according to the second modification. As the basic configuration of the ultrasonic flow sensor is the same as the configuration of the first modification described in conjunction with FIG. 32 to FIG. 34, the description will be omitted. Different points from the configuration illustrated in FIG. 32 to FIG. 34 are the shape of the first arm portions 62 and the configuration of the guide portions. The first arm portions 62 include portions 62a extending upward and portions 62b fastened to the portions 62a and extending downward in the same manner as FIG. 32 to FIG. 34. The portions 62b are provided with hook-shaped contact portions 67 at ends thereof. The contact portions 67 engage inclined walls 93 provided at ends of the second arm portions 56.

More specifically, the operation is the same as that described above with reference to FIG. 33 and FIG. 34. In other words, the first sensor unit 6 (the first fitting which holds the first sensor unit 6) is pressed against the piping P via the first position regulating portion 60, and the second sensor unit 8 (the second fitting which holds the second sensor unit 8) is pressed against the piping P via the second position regulating portion 54 (see FIG. 36). Subsequently, either one or both of the first sensor unit 6 (the first fitting which holds the first sensor unit 6) or the second sensor unit 8 (the second fitting which holds the second sensor unit 8) is moved along the axial direction of the piping P. Accordingly, the state in which the contact portions 67 come into contact with the inclined walls 93 (see FIG. 37) corresponds to a state in which the relative position between the first sensor unit 6 and the second sensor unit 8 in the axial direction of the piping P is optimally adjusted. In this manner, the contact portions 67 and the inclined walls 93 may guide the adequate relative position between the first sensor unit 6 and the second sensor unit 8 along the axial direction of the piping P.

What is claimed is:

1. An ultrasonic flow sensor comprising:
   a first sensor unit including a first ultrasonic device which performs at least one of transmission of ultrasonic waves to a fluid flowing in piping or reception of ultrasonic waves from the fluid flowing in the piping;
   a second sensor unit including a second ultrasonic device which performs at least the other one of transmission of ultrasonic waves to a fluid flowing in the piping or reception of ultrasonic waves from the fluid flowing in the piping;
   a calculation part configured to calculate a flow rate of the fluid in the piping by obtaining a time difference between times required for ultrasonic waves to propagate from an upstream side to a downstream side and from the downstream side to the upstream side of the fluid flowing in the piping based on output signals from the first ultrasonic device and the second ultrasonic device;
   a first fitting configured to accommodate the first sensor unit and fix the first sensor unit to the piping, the first fitting including a first position regulating portion configured to come into contact with an outer peripheral surface of the piping so as to align orientation of the first ultrasonic device with respect to the second ultrasonic device in an axial direction of the piping when viewing in a radial direction of the piping and a first housing portion configured to accommodate the first sensor unit from the opposite side of the piping with respect to the first position regulating portion; and
   a second fitting configured to accommodate the second sensor unit and fix the second sensor unit to the piping, the second fitting including a second position regulating portion configured to come into contact with the outer peripheral surface of the piping so as to align orientation of the second ultrasonic device with respect to the first ultrasonic device in the axial direction of the piping when viewing in the radial direction of the piping, and a second housing portion configured to accommodate the second sensor unit from the opposite side of the piping with respect to the second position regulating portion,
   wherein the first and second fittings further include: a pair of first and second arm portions extending from one of the first housing portion and the second housing portion to the other to regulate the relative position between the first housing portion and the second housing portion in a circumferential direction of the piping on both sides of a plane including the axial line of the piping, the first ultrasonic device, and the second ultrasonic device; and a guide portion formed at least on the arm portions and configured to guide relative positioning between the first fitting and the second fitting in the axial direction of the piping according to a diameter of the piping.

2. The ultrasonic flow sensor according to claim 1, wherein the pair of arm portions are provided on each of the first fitting and the second fitting.

3. The ultrasonic flow sensor according to claim 1, wherein the pair of arm portions are configured between the first fitting and the second fitting.

4. The ultrasonic flow sensor according to claim 1, wherein the guide portion is provided on both of the pair of arm portions.

5. The ultrasonic flow sensor according to claim 1, wherein the guide portion includes a projection formed on one of the pair of arm portions, and a contact portion provided on the other one of the pair of arm portions and configured to abut against and stop the projection in the axial direction of the piping.

6. The ultrasonic flow sensor according to claim 2, wherein the arm portion extends from an end of the first position regulating portion or the second position regulating portion.

7. The ultrasonic flow sensor according to claim 1, wherein the guide portion guides positioning based on an angle of inclination from a diameter direction of the piping toward a longitudinal direction of the piping.

8. The ultrasonic flow sensor according to claim 1, wherein the pair of arm portions are both shaped by molding.

9. The ultrasonic flow sensor according to claim 1, wherein one of the pair of arm portions is shaped by molding and the other is bendable in the circumferential direction of the piping.

10. The ultrasonic flow sensor according to claim 2, wherein the first arm portions and the second arm portions include an overlapped portion positioned adjacent to each other, and the guide portion is provided on the overlapped portion.

11. The ultrasonic flow sensor according to claim 1, further comprising a fixing member configured to fix the first and second fittings to the piping, and the fixing member is formed of a band to be wound around the piping.

12. The ultrasonic flow sensor according to claim 11, wherein at least one of the first and second fittings further includes a biasing member configured to bias the first sensor unit or the second sensor unit toward the piping.

13. A method of attaching an ultrasonic flow sensor comprising:

preparing the ultrasonic flow sensor including a first sensor unit including a first ultrasonic device which performs at least one of transmission of ultrasonic waves to a fluid flowing in piping and reception of ultrasonic waves from the fluid flowing in the piping;

a second sensor unit including a second ultrasonic device which performs at least the other one of transmission of ultrasonic waves to a fluid flowing in the piping and reception of ultrasonic waves from the fluid flowing in the piping;

a calculation part configured to calculate a flow rate of the fluid in the piping by obtaining a time difference between times required for ultrasonic waves to propagate from an upstream side to a downstream side and from the downstream side to the upstream side of the fluid flowing in the piping;

a first fitting configured to accommodate the first sensor unit and fix the first sensor unit to the piping, the first fitting including a first position regulating portion configured to come into contact with an outer peripheral surface of the piping so as to align orientation of the first ultrasonic device with respect to the second ultrasonic device in an axial direction of the piping when viewing in a radial direction of the piping and a first housing portion configured to accommodate the first sensor unit from an opposite side of the piping with respect to the first position regulating portion;

a second fitting configured to accommodate the second sensor unit and fix the second sensor unit to the piping, the second fitting including a second position regulating portion configured to come into contact with the outer peripheral surface of the piping so as to align orientation of the second ultrasonic device with respect to the first ultrasonic device in the axial direction of the piping when viewing in the radial direction of the piping, and a second housing portion configured to accommodate the second sensor unit from the opposite side of the piping with respect to the second position regulating portion; and a fixing member configured to press and fix the first fitting and the second fitting with respect to the piping, wherein the first and second fittings further include: a pair of arm portions extending from one of the first housing portion and the second housing portion to the other to regulate the relative position between the first housing portion and the second housing portion in a circumferential direction of the piping on both sides of a plane including the axial line of the piping, the first ultrasonic device, and the second ultrasonic device; and a guide portion formed at least on the arm portions and configured to guide relative positioning between the first fitting and the second fitting in the axial direction of the piping according to a diameter of the piping;

a first step of provisionally fixing the second sensor unit to the piping by using the second fitting;

a second step of rotating the second fitting in the circumferential direction of the piping after the first step;

a third step of provisionally fixing the first sensor unit to the piping by using the first fitting and adjusting relative position between the first fitting and the second fitting based on an action of information conversion mechanism before the provisional fixation after the second step; and fixing the first fitting and the second fitting to the piping after the third step.

14. The method of attaching an ultrasonic flow sensor according to claim 13, wherein the fixation of the first fitting to the piping is achieved by using a first belt, and fixation of the second fitting to the piping is achieved by a second belt different from the first belt.

15. The method of attaching an ultrasonic flow sensor according to claim 13, wherein the first belt and the second belt are the same, and the first and second fittings are fixed to the piping by using common belts.

* * * * *